(12) United States Patent
Forutanpour et al.

(10) Patent No.: US 8,121,472 B2
(45) Date of Patent: Feb. 21, 2012

(54) SIGNAL MEASUREMENTS EMPLOYED TO AFFECT PHOTOGRAPHIC PARAMETERS

(76) Inventors: Babak Forutanpour, San Diego, CA (US); Brian Momeyer, San Diego, CA (US); David L. Bednar, San Diego, CA (US)

( * ) Notice: Subject to any disclaimer, the term of this patent is extended or adjusted under 35 U.S.C. 154(b) by 0 days.

(21) Appl. No.: 12/835,454

(22) Filed: Jul. 13, 2010

(65) Prior Publication Data

US 2011/0058802 A1 Mar. 10, 2011

Related U.S. Application Data

(60) Provisional application No. 61/241,351, filed on Sep. 10, 2009.

(51) Int. Cl.
*G03B 17/00* (2006.01)
*G03B 7/00* (2006.01)
*H04N 9/73* (2006.01)

(52) U.S. Cl. ............... 396/225; 396/50; 348/226.1

(58) Field of Classification Search ............... 396/225
See application file for complete search history.

(56) References Cited

U.S. PATENT DOCUMENTS

| | | | | |
|---|---|---|---|---|
| 5,315,342 | A * | 5/1994 | Cocca | 396/104 |
| 2002/0159770 | A1 * | 10/2002 | Moultrie, Jr. | 396/265 |
| 2005/0122405 | A1 | 6/2005 | Voss | |
| 2005/0146622 | A9 * | 7/2005 | Silverstein | 348/211.4 |
| 2006/0269270 | A1 | 11/2006 | Yoda | |
| 2007/0285550 | A1 | 12/2007 | Son | |
| 2009/0079846 | A1 | 3/2009 | Chou | |

(Continued)

FOREIGN PATENT DOCUMENTS

JP 06235954 A * 8/1994

(Continued)

OTHER PUBLICATIONS

English translation of KR 2009-0061962.*

(Continued)

*Primary Examiner* — Clayton E Laballe
*Assistant Examiner* — Leon W Rhodes, Jr.
(74) *Attorney, Agent, or Firm* — Espartaco Diaz Hidalgo

(57) ABSTRACT

Subject matter disclosed herein relates to setting photographic parameters based, at least in part, on signal measurements, such as, for example, without limitation, position of the Sun. Briefly, in accordance with one embodiment, an apparatus may comprise the following: a wireless communication capable device (E.G., 400, 1100) including an integrated digital camera (E.G., 1180, 402); the device capable of estimating position of the Sun relative to the position of the device based at least in part on signal information received via wireless communication; and the device being further capable of using the estimated position of the Sun so as to affect one or more photographic parameters. Briefly, in accordance with another embodiment, a method may comprise the following: acquiring information via wireless communication (E.G., 710); estimating a position of the Sun relative to a particular selected position based at least in part on the acquired information; and setting photographic parameters of a digital camera based, at least in part, on the estimated position of the Sun (E.G., 730). Briefly, in accordance with yet another embodiment, an article comprises: a storage medium having stored thereon instructions capable of being executed by a special purpose computing platform to: acquire information via wireless communication; estimate a position of the Sun relative to a particular selected position based at least in part on the acquired information; and set photographic parameters of a digital camera based, at least in part, on the estimated position of the Sun.

34 Claims, 18 Drawing Sheets

U.S. PATENT DOCUMENTS

| | | | |
|---|---|---|---|
| 2009/0162042 A1* | 6/2009 | Wexler et al. | 396/49 |
| 2010/0309321 A1* | 12/2010 | Brunner et al. | 348/208.2 |

FOREIGN PATENT DOCUMENTS

| | | | |
|---|---|---|---|
| JP | 2003244709 A | | 8/2003 |
| JP | 2004117478 A | * | 4/2004 |
| JP | 2004336369 A | | 11/2004 |
| JP | 2005328271 A | | 11/2005 |
| JP | 2006041800 A | * | 2/2006 |
| JP | 2008017223 A | | 1/2008 |
| KR | 20090061962 | | 6/2009 |

OTHER PUBLICATIONS

Briganti, David, "Panasonic's Versatile Line Offers a High-Performing LUMIX Digital Camera for All Types of Photographers", American Photo Magazine, AmericanPhotoMag.com, Sep./Oct. 2009, 3 pages.

Metz, Rachel, "Another Use for Your Phone: 'Augmented Reality'", downloaded from http://www.pantagraph.com/business/article_de6ed7ae-b1a4-11de-9587-001cc4c002e0.html, AP Technology Writer, Posted online Monday, Oct. 5, 2009, 3 pages.

Leonard et al., "Directed Sonar Sensing for Mobile Robot Navigation", Revised version of the D.Phil. thesis of John J. Leonard, submitted in Oct. 1990 to the University of Oxford, current version dated Jan. 1992, 202 pages.

International Search Report and Written Opinion—PCT/US2010/048493, International Search Authority—European Patent Office—Dec. 6, 2010.

Briganti, D. "Panasonic's Versatile Line Offers a High-Performing LUMIX Digital Camera for All Types of Photographers" (Advertisement) American Photo Magazine Sep./Oct. 2009.

* cited by examiner

SIGNAL MEASUREMENTS EMPLOYED TO AFFECT PHOTOGRAPHIC PARAMETERS

BACKGROUND

1. Field

Subject matter disclosed herein relates to using signal measurements to affect or set photographic parameters

2. Information

Today handheld devices, such as smart cell phones or personal digital assistants (PDAs), come with a variety of features, which may include, typically, a digital camera, satellite positioning system (SPS) capability, a compass, and an ability to wirelessly connect to the Internet, among others. Among such features, a digital camera, for example, may be presented with a number of operating challenges, such as image focus, light characteristics, shutter speed, and so on. To make matters more challenging, at least a portion of photos may be taken under poor lighting. Accordingly, there is a need for improved techniques of determining or estimating camera or photographic parameters.

SUMMARY

Subject matter disclosed herein relates to setting photographic parameters based, at least in part, on signal measurements, such as, for example, without limitation, position of the Sun. Briefly, in accordance with one embodiment, an apparatus may comprise the following: a wireless communication capable device including an integrated digital camera; the device capable of estimating position of the Sun relative to the position of the device based at least in part on signal information received via wireless communication; and the device being further capable of using the estimated position of the Sun so as to affect one or more photographic parameters. Briefly, in accordance with another embodiment, a method may comprise the following: acquiring information via wireless communication; estimating a position of the Sun relative to a particular selected position based at least in part on the acquired information; and setting photographic parameters of a digital camera based, at least in part, on the estimated position of the Sun. Briefly, in accordance with yet another embodiment, an article comprises: a storage medium having stored thereon instructions capable of being executed by a special purpose computing platform to: acquire information via wireless communication; estimate a position of the Sun relative to a particular selected position based at least in part on the acquired information; and set photographic parameters of a digital camera based, at least in part, on the estimated position of the Sun.

BRIEF DESCRIPTION OF THE FIGURES

Non-limiting and non-exhaustive features will be described with reference to the following figures, wherein like reference numerals refer to like parts throughout the various figures.

DETAILED DESCRIPTION

Figure 1:
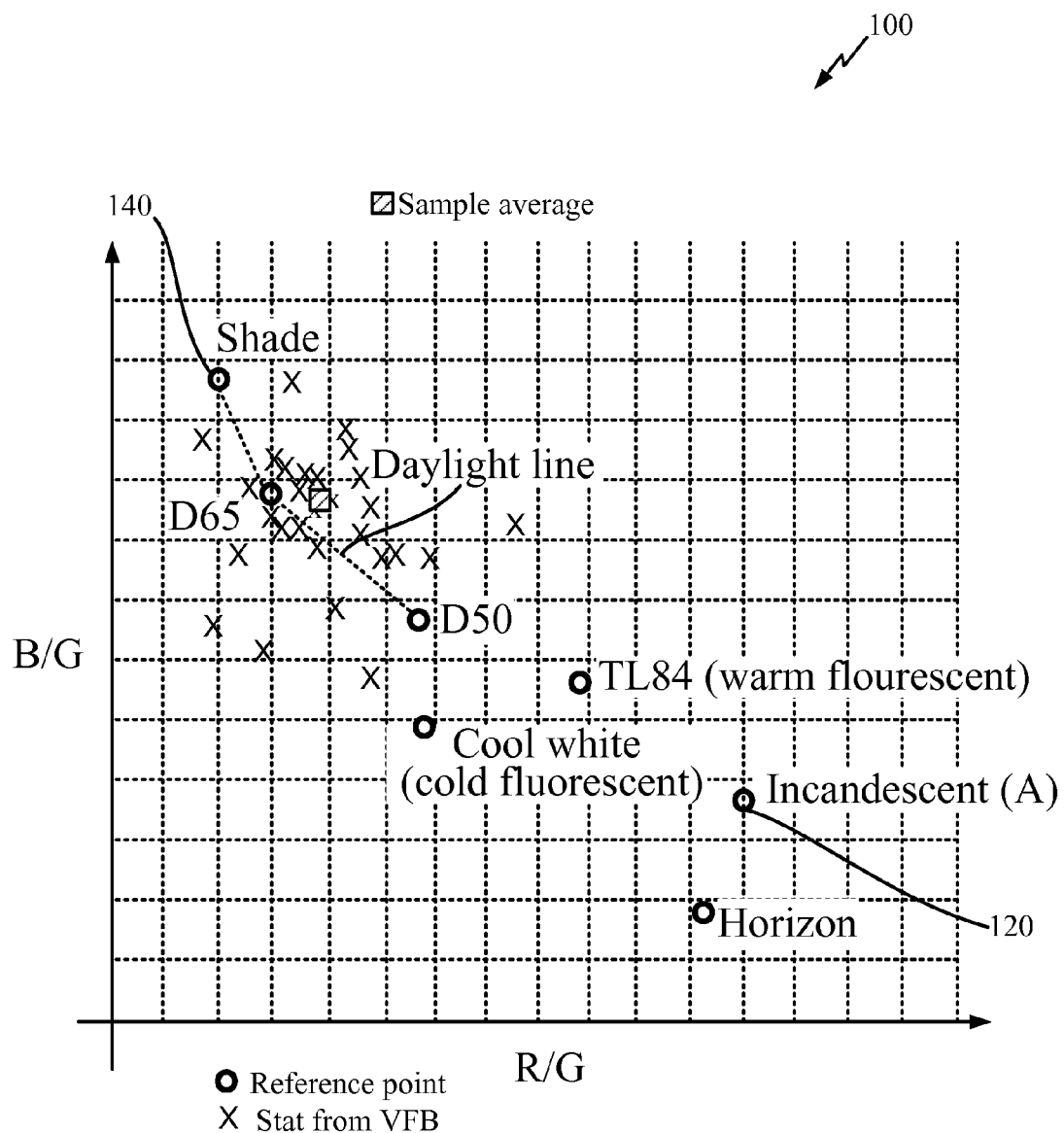
FIG. 1 is a spectral plot of an embodiment of selected illuminants.

In the following description of embodiments, reference is made to accompanying drawings which form a part hereof, and in which it is shown, by way of illustration, specific embodiments of claimed subject matter. It is to be understood that other embodiments may include, for example, changes or alterations, such as structural changes, which may be made. All embodiments, changes or alterations, including those described herein, are not intended departures from scope with respect to claimed subject matter.

Some portions of the detailed description included herein may be presented in terms of algorithms or symbolic representations of operations on or applied to binary digital signals stored within a memory of a specific apparatus or special purpose computing device or platform. In the context of this particular specification, the term specific apparatus or the like may include a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the following discussion, it is appreciated that throughout this specification, discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of a special purpose computer or similar special purpose electronic computing device.

The terms "and," "and/or," and "or," as used herein, may include a variety of meanings typically depend at least in part upon the context in which the terms are used. Typically, "and/or" as well as "or" if used to associate a list, such as A, B or C, is intended to mean A, B, and C, here used in the inclusive sense, as well as A, B or C, here used in the exclusive sense. Reference throughout this specification to "one embodiment" or "an embodiment" is intended to refer to a particular feature, structure, or characteristic described in connection with an embodiment included in at least one embodiment of claimed subject matter. However, appearances of the phrase "in one embodiment" or "an embodiment" in various places throughout this specification are not necessarily all referring to the same embodiment. Furthermore, particular features, structures, or characteristics may be combined in one or more embodiments. Embodiments described herein may include systems, machines, devices, engines, or apparatuses that operate using digital signals. Such signals may comprise electronic signals, optical signals, electromagnetic signals, or any form of energy that may be used provides information between two or more separate locations.

Mobile computing platforms include a range of handheld devices including, but not limited, to handheld cell phones, personal digital assistants (PDAs), mobile stations, mobile devices or mobile station devices. In this context, the term mobile device or mobile computing platform refers to a portable device including a processor coupled to memory so as to be capable of performing arithmetic or logical computations. Examples are not limited to handheld devices and may include, for example, a laptop computer or the like. Manufacturers of these devices typically seek a competitive advantage by incorporating diverse functional utility typically intended to capture interest from consumers. Enhancements to these devices may include: global positioning (GPS), music players, internet browsing, digital still or video camera capability, etc. In this context, a digital camera incorporated into a mobile device or mobile computing platform may be referred to as an integrated digital camera.

Providing advanced or improved capability for digital still or video cameras to consumers may at times prove to be a challenge for manufactures of such devices, however. For example, a typical consumer may have vast experience evaluating photographic images due in large part to the maturity of photographic technology generally. Also, the visual nature of photography generally may lend itself to direct comparisons by consumers. In contrast, other forms of functionality or other capabilities being offered in connection with such devices may not so easily be compared by attribute. For example, GPS function may be more difficult for consumers to evaluate due at least in part to its relatively recent introduction as a product offering. Also, a typical consumer may not have a complete technical appreciation for such an offering. Likewise, digital cameras typically do not have GPS or similar sensors while the cameras in mobiles phones typically do. We wish to exploit these technologies in helping the device capture the moment more true to life.

However, state of the art mobile computing platforms or mobile devices have a capability to obtain measurements of various signals that provide information to the device or platform and may be utilized in connection with estimating or determining photographic or camera parameters for an integrated digital camera. In this context, the term photographic parameter or camera parameter refers to a setting of a digital camera employed to affect the appearance of an image captured or to be captured by the digital camera. Such measurements may include, for example, time of day estimates, position/location estimates, orientation estimates, or assessments of indoor/outdoor situations, as described below in more detail. Of course, the foregoing is not intended as an exhaustive list of possible measurements capable of being obtained by a mobile device or computing platform. For a mobile device having an integrated digital camera, measurements may be employed to affect camera parameters, such as for a camera image preview or a camera image being captured, for example. Examples of parameters include white balance, flicker compensation, shutter speed, or aperture setting, among others. In a particular implementation, an integrated digital camera may include a best-shot scene selection feature, in which a device may, without additional user information being entered, detect aspects of a scene and make a selection regarding values of photographic parameters to use so that a captured image of the scene may be aesthetically pleasing to a user or capture an image that is a reasonably accurate representation of the scene as viewed by a user.

Wireless communication that may be employed in a particular implementation or embodiment may include, for example, SPS signal communications wireless Internet signal communications, or any combination thereof. Similarly, in a particular embodiment, an integrated digital camera may make measurements useful for estimating or affecting camera or photographic parameters by employing electromagnetic signals, audio signal, sonar signals, or any combination thereof, as explained in more detail below.

In an implementation or embodiment, an integrated digital camera may, for example, include an automatic white balance (AWB) capability. For example, an AWB capability may involve a camera shooting or acquiring at least a partial sample image and employing pixels from the sample image to assess illuminant conditions that may be applied to an image about to be captured. A number of approaches are possible and well-known and it is not intended that improvements described here be limited to a particular approach. However, for purposes of illustration, for a set of 8-bit value pixels that are near gray (luma >70 and less than 190, with Cb and Cr chroma channels close to 128), for example, ordered pairs of pixels may be plotted based at least in part, on a ratio of a blue component to a green component and a ratio of a red component to the green component of such a pixel pair. An example of such a plot is illustrated in FIG. 1 and is referred to here as a spectral plot. Pixels may be plotted on a two dimensional graph 100 and clustering of pixels may be examined. As illustrated by FIG. 1, clustering may indicate a type of light or illuminant that may be realized in an image if an image were to be captured. For example, clustering of pixels 120 may indicate incandescent light, whereas clustering of pixels 140 may indicate shaded daylight.

As a result of assessing illuminant conditions, a digital camera, including an integrated digital camera, may at least partially correct or adjust for an illuminant that would otherwise result in an image having a white balance that is atypical or undesirable. For example, certain types of light may produce a yellowish tint or a bluish tint if an image were to be captured with a particular illuminant present. Therefore, by employing various techniques, a digital camera, including an integrated digital camera, may be able to at least partially undo this color cast through scaling of pixel's red, green, and blue values to produce an image that may better represent the scene the way it may have been intended.

In view of a potential to achieve favorable results from assessing illuminant conditions, therefore, in an implementation, an embodiment of an integrated digital camera may make an improved assessment regarding type of illuminant, for example, by employing features of a mobile computing platform to perform measurements that may be used to affect camera parameters for an image to be captured. For example, an implementation may include an onboard clock or an onboard GPS or SPS tracker. Using the onboard clock or SPS tracker, an embodiment may implement a process, for example (or it may employ a look-up table in another implementation) to assess whether a conventional AWB calculation or process ought to be modified in some fashion to make an improved determination regarding illuminant conditions.

Figure 2:
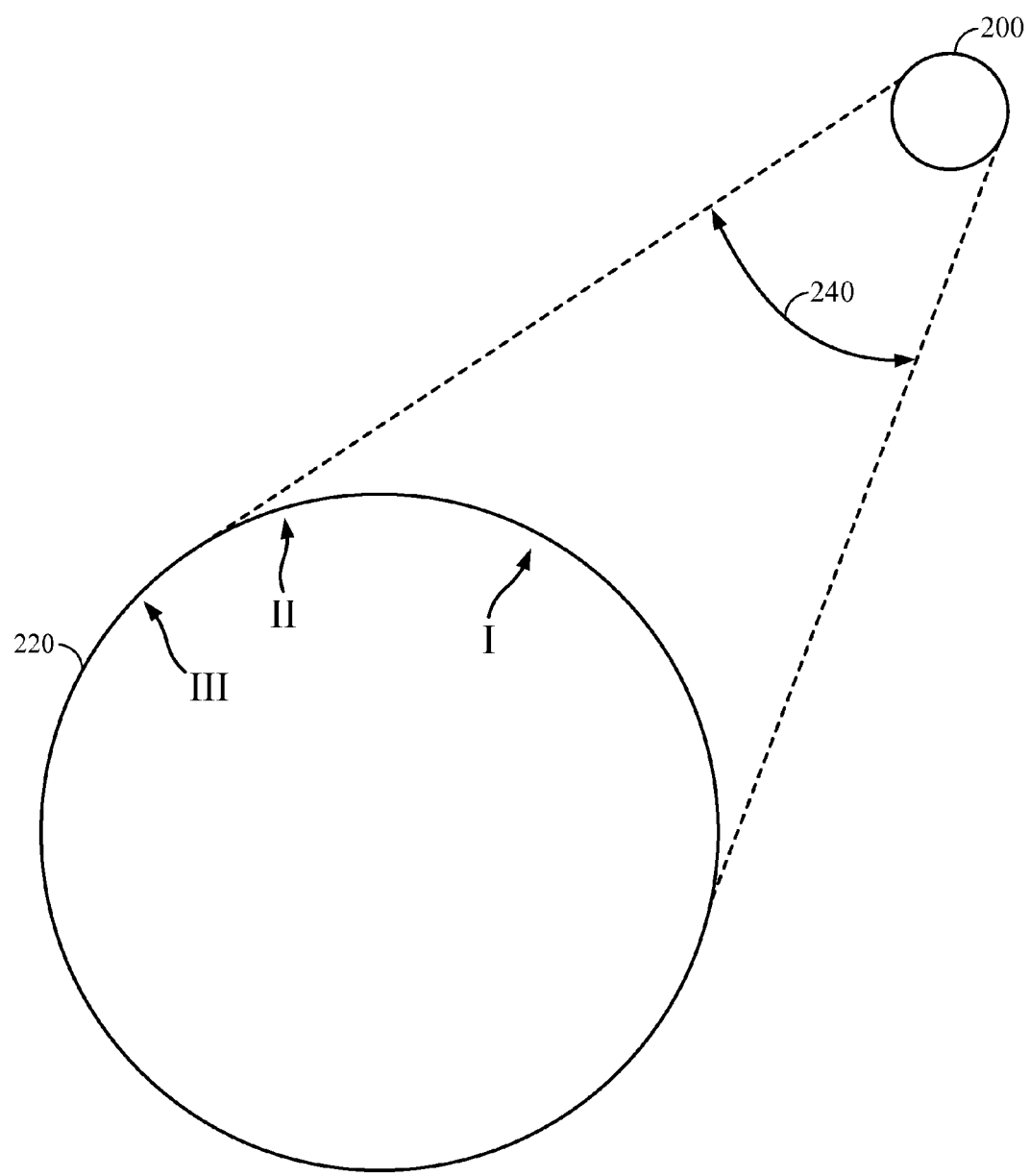
FIG. 2 is a schematic diagram illustrating sunlight illuminating Earth at various points.

In one implementation, a device, such as an integrated digital camera, may modify a process to at least partially adjust white balance for an image to be captured based, at least in part, on Sun position relative to where the device is located. Such an adjustment may be beneficial, as explained in detail below, since brightness or color of sunlight may vary over the course of a day, for example. FIG. 2 is a schematic diagram illustrating sunlight 240 illuminating Earth 220 at various points. As Earth 220 rotates about its axis, Sun 200 may illuminate different portions of the Earth with various intensities. Additionally, effects of the Earth's atmosphere at various sunlight angles may result in various spectral, or color, distributions. For example, at position I, the Sun may be essentially overhead, resulting in relatively high intensity sunlight or illumination. At position II, in this example, incident sunlight may have a relatively highly skewed angle, resulting in relatively low intensity sunlight having reddish hues compared to sunlight that is overhead. Further, at position III, in this example, the Sun is below the horizon and, therefore, not visible.

Being able to determine the position of the Sun relative to the device may affect a determination regarding white balance. Processes are well-known for estimating Sun position from other information including time of day and location information. Therefore, details of such processes shall not be described here in detail. Nonetheless, if, for example, in an implementation, a device is able to determine that the Sun is essentially overhead from time of day and location information, such as at position I, a similar approach as previously described with respect to FIG. 1 may be employed without significant modification. However, in contrast, if in an embodiment, a mobile computing device is able to determine from time of day signal information and location information, such as SPS signal information, as one simple example, that the Sun is essentially below the horizon relative to the device, such as at position III, this may indicate that the illuminant present during capture of an image may comprise artificial light. Accordingly, a process for determining photographic parameters may reduce the number of illuminants being considered. As a result, typically, more accurate results should be obtained using, for example, a clustering approach as previously described, for example. This is illustrated, for example, by FIG. 3, showing a color plot 300 similar to that shown in FIG. 1, except that fewer illuminants 310 are employed.

Figure 3:
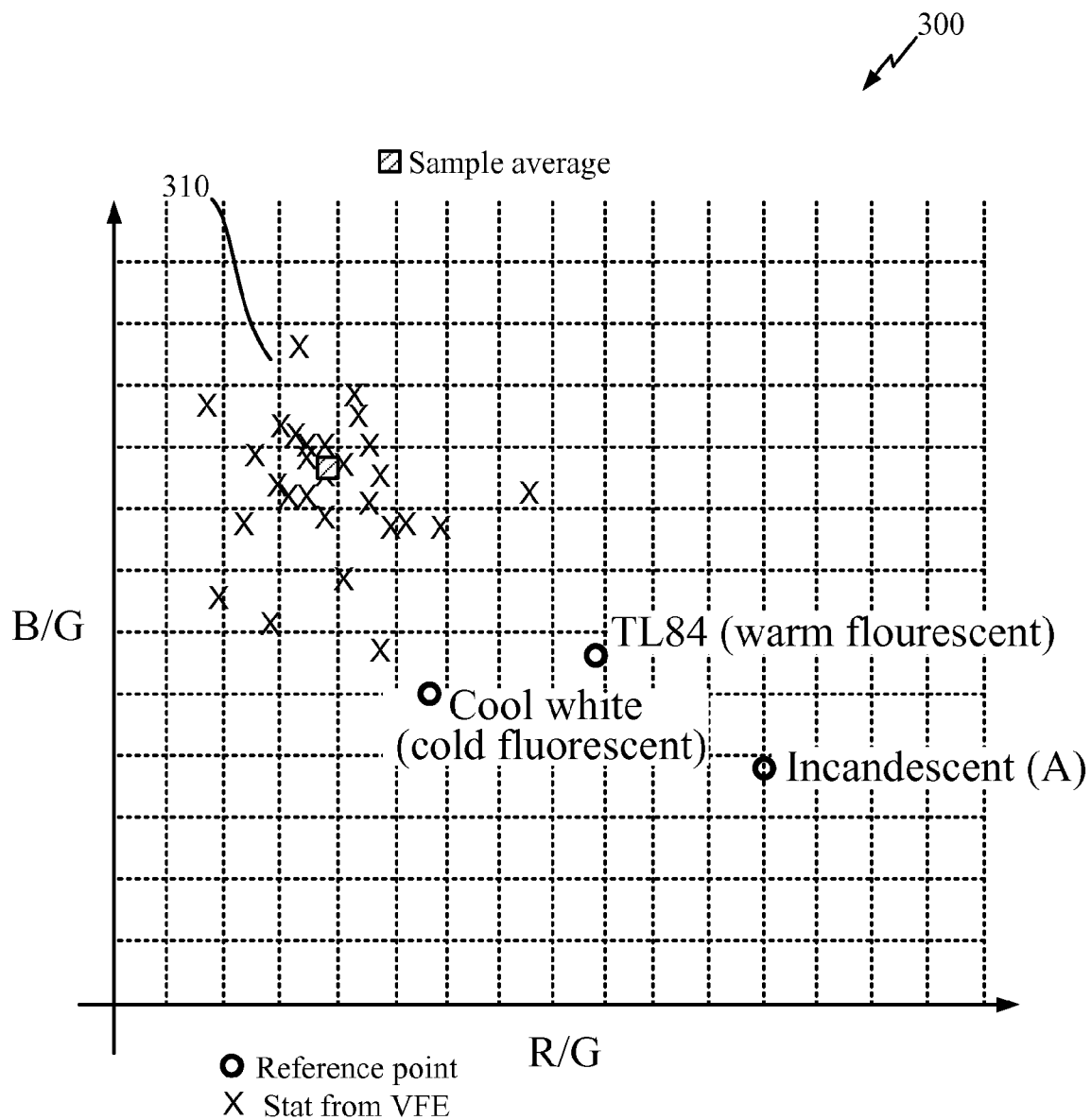
FIG. 3 is a spectral plot of another embodiment of selected illuminants.

Of course, claimed subject matter is not limited in scope to the approach illustrated by FIGS. 1 and 3. These are provided for purposes of illustration. Many different approaches to determining white balance are possible and included within the scope of claimed subject matter. Nonetheless, in an embodiment or implementation in accordance with claimed subject matter, for example, a determination regarding the relative position of the Sun may be employed to make a more accurate assessment regarding the possible illuminants for an image to be captured.

In another example, a device camera may employ information regarding time of day and location, such as via SPS signal information, for example, for additional photographic parameter processing. For example, various color hues during setting of the Sun or rising of the Sun may affect photographic parameters for an image to be captured. It is noted, of course, that the description previously described are merely illustrative examples and are not intended to limit the scope of claimed subject matter. For example, other implementations employing time of day or location information may be employed. For white balance determination, a host of possible illuminants related to location or time of day may be employed or other photographic parameter adjustments may be affected by an estimate regarding position of the Sun, for example, as described in more detail below.

In another implementation, for example, that may substitute for or complement other possible implementations, including those previously described, information, such as SPS signal communication or wireless Internet signal communication, for example, may be employed to affect camera parameters regarding performing white balance setting, as well as setting other camera or photographic parameters that may impact appearance of a captured image, for example. It may, for example, be possible for a mobile computing platform to determine camera location to a relatively high degree of accuracy. As one example, without limitation, SPS signal information may be received to permit such a determination or calculation. Likewise, using other signaling information, such as mapping information available, for example, via the Internet, a mobile computing platform may be able to determine with reasonably high accuracy whether its current location comprises an indoor location or an outdoor location.

Information regarding indoor/outdoor position or location may be employed in a variety of ways for an integrated digital camera. For example, as previously suggested, a determination regarding an indoor position or location may indicate artificial light is present, which may be employed to make a more accurate white balance determination than if this information were not available. Furthermore, information regarding indoor location may be employed to make a determination regarding whether or not to employ flicker detection and likewise flicker compensation, as described below. For example, if a mobile computing platform having an integrated digital camera is able to determine with reasonable likelihood that the device is located at an outdoor position, flicker detection or compensation may be omitted, thereby conserving battery power of the device, for example.

As another example of a particular implementation, an integrated digital camera may include a mode intended to allow a user to produce a 'best" shot or image without having the user set or select particular camera or photographic parameters. For example, a device may include features such as automatic focus, automatic exposure, and so on, id capturing pictures of fireworks, snow, etc.

However, an assessment regarding indoor or outdoor location of a device, for example, may be employed to in conjunction with a process for selecting a best shot modes. For example, a camera, such as an integrated digital camera, may include a best shot mode for capturing outdoor images involving snow or a fireworks display. Of course, there are non-limiting examples provided solely for purposes of illustration. However, with information regarding indoor or outdoor location of a device, a process for selecting a best shot mode may be enhanced. For example, if a system reports that the sun has set, Auto-Scene Detection may put less emphasis on Snow Mode, and regard white content as something other than snow whose reflective properties might otherwise result in an image that is over-exposed if not taken into account. In particular, it is more likely that applied photographic parameters will be appropriate for the particular situation resulting in a higher quality captured image than otherwise might have been produced.

In another particular implementation, a device such as a mobile computing platform may utilize a look-up table or code to determine the location of the Sun position for a particular location and particular time of day. Likewise, in embodiments in which a device, such as a mobile computing platform includes a compass or an accelerometer, the device may determine a lens or system of lenses of an integrated digital camera is pointed in a direction having the Sun in the background, for example, for an image to be captured. In situations such as this, as only an example, where the Sun is known to be close to the horizon and the user is pointing the device West, the likelihood of enabling the backlight exposure compensation increases. Backlight exposure compensation is well-understood and shall not be described in detail here; nonetheless, claimed subject matter is, of course, not limited to a particular approach to backlight exposure compensation or to employing backlight exposure compensation. For example, in alternate embodiments, an alarm or other warning may sound, a warning message may appear or a warning message may be played or synthesized, to name a few possible other embodiments.

Figure 4:
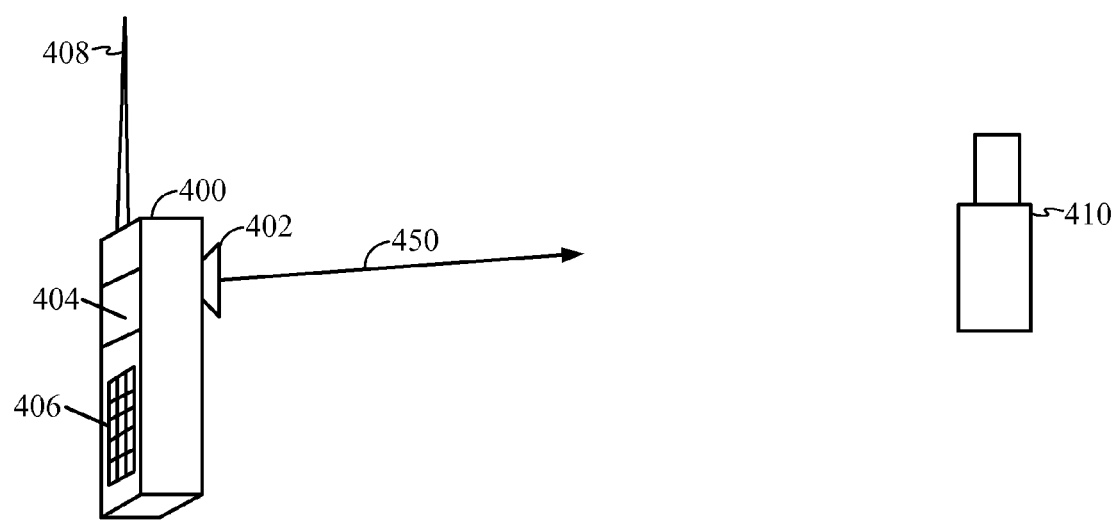
FIG. 4 is a schematic diagram of an embodiment of an integrated digital camera.

FIG. 4 is a schematic diagram illustrating one embodiment 400 of a mobile computing platform or mobile device having an integrated digital camera. In FIG. 4, an object or scene 410 is arranged to be captured by embodiment in an image. Although claimed subject matter is not limited in scope in this respect, embodiment 400 may include a digital camera 402, a display 404, a keypad 406, and an antenna 408. For example, embodiment 400 may display a viewfinder image or a captured image in display 404. Likewise, embodiment 400 may include a special or specific purpose processor to host one or more applications, as described in greater detail below. A specific purpose processor may include, but is not limited to, a general purpose processor programmed with specific instructions for executing or performing one or more particular operations. For example, specific instructions may be executed or performed to generate one or more user interfaces such as to be viewed via display 404, which also may comprise a touch screen, for example. Antenna 408 may comprise a portion of a transmitter/receiver integrated within the device to transmit or receive various signals, such as to/from a positioning system or to/from the Internet via a base station or router, for example. The embodiment of FIG. 4 is merely provided for purposes of illustration. It is not intended that claimed subject matter be limited in scope to the embodiment of FIG. 4. Many other embodiments are possible and are intended to be included within the scope of claimed subject matter including, for example, other embodiments described elsewhere in this specification.

Figure 6:
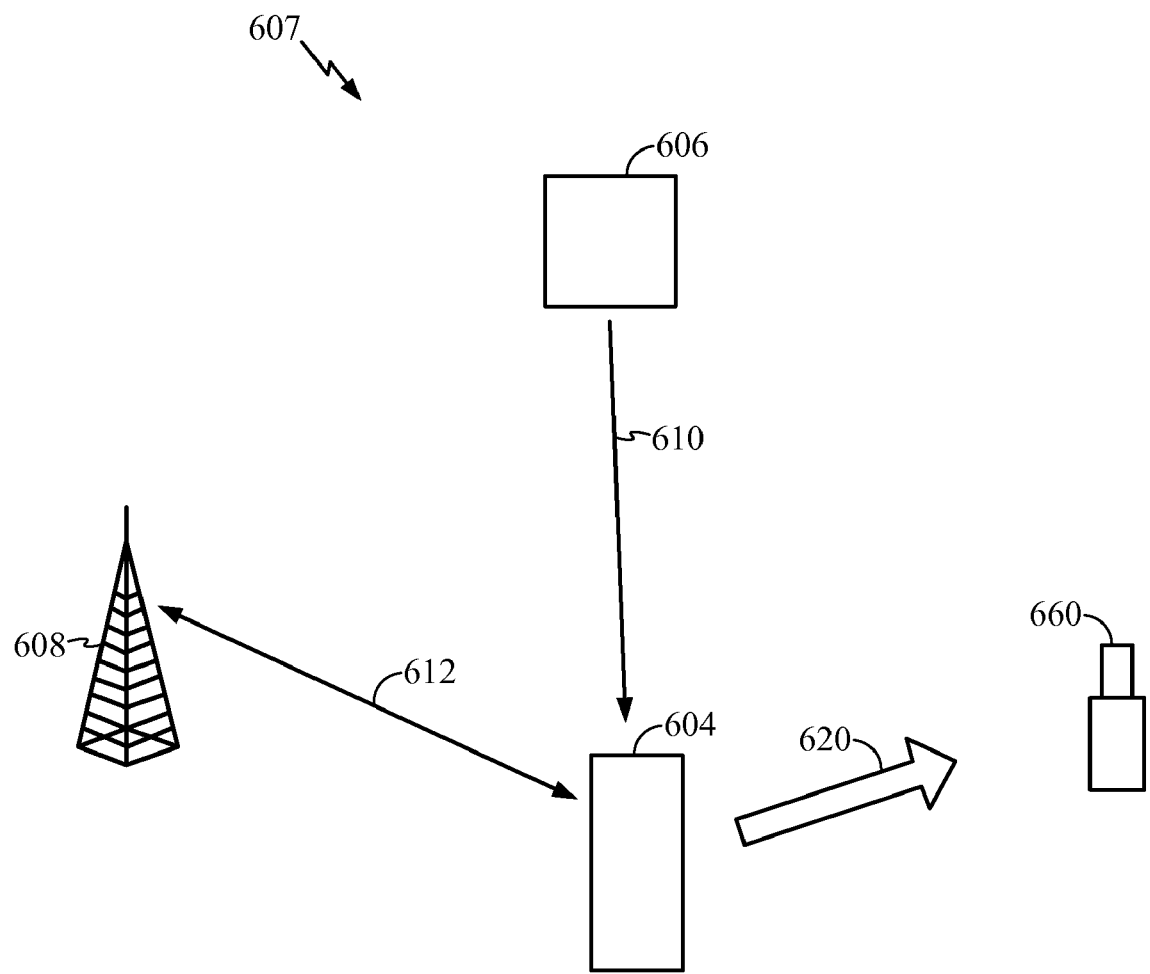
FIG. 6 is a schematic diagram of another embodiment of a communications network.

FIG. 6 is a schematic diagram of an embodiment of a communications network including an embodiment of an integrated digital camera. FIG. 6 shows a system 607 of components that may communicate with one another to exchange photographic or camera parameters. In a particular embodiment, a device 604 may comprise any one of a variety of mobile receivers capable of receiving satellite navigation signals 610 or capable of transmitting or receiving wireless communication signals 612 to or from a base station 608. Device 604 may comprise a mobile computing platform that integrates a digital camera, a wireless phone, a handheld navigation receiver, or a personal digital assistant (PDA), just to name a few examples. Device 604 may be physically located in a particular region at a particular time and positioned to capture an image (e.g., take a photo) of an object 660. As explained above, knowledge of physical location or time may allow device 604 to determine a position of the Sun relative to the device. In turn, such may lead to improved techniques for setting or determining other photographic parameters. As mentioned above, device 604 may employ any of several techniques to compute its position. In a particular implementation, such a positioning technique may be based, at least in part, on wireless signals 610 or wireless signals 612 received from satellite 606 or land-based base station 608, respectively. Of course, such details of system 607 are merely examples, and claimed subject matter is not so limited. Related principles and techniques for these examples may be applicable to other satellite positioning systems or terrestrial positioning systems such as a wireless network. It is intended that claimed subject matter include any and all such systems.

Figure 5:
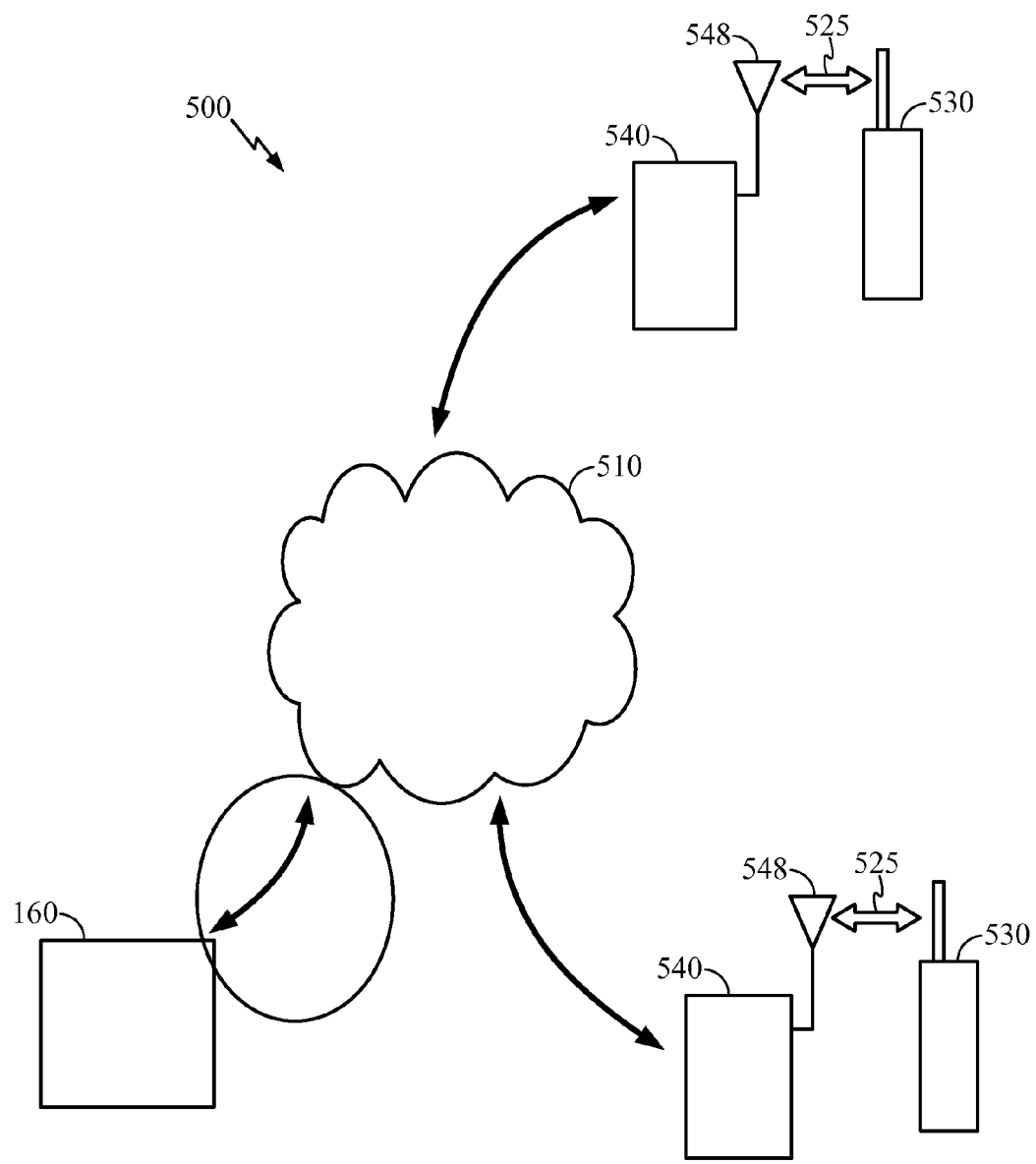
FIG. 5 is a schematic diagram of an embodiment of a communications network.

FIG. 5 is a schematic diagram illustrating another embodiment 500 of a communications network. As illustrated, embodiment 500 may include the Internet, depicted using reference numeral 510, base stations or routers 540, and a mobile device or mobile computing platform 530, for example. Although claimed subject matter is not limited in scope in this respect, in a particular embodiment, server 560 may maintain a database of photographic or camera parameters, such as those previously described, for example. Of course, additional photographic or camera parameters other than those specifically previously described may likewise be included. Likewise, in a particular embodiment, server 560 may be communicatively coupled to Internet 510. Although other types of devices are possible in alternate embodiments, device or platform 530 may comprise a wireless mobile device, such as a cellular phone, a PDA, or a laptop computing device, for example. Likewise, base station or router 540 may comprise a wireless base station or router device capable of receiving or transmitting wireless signals from or to device 530 via an antenna 548, for example. Base station or wireless router 540 may further communicate with Internet 510 directly or via a local area network (LAN) or wide area network (WAN), although claimed subject matter is not so limited. In one particular implementation, wireless base station or router 540 may comprise a relay to receive wireless signals from device 530 and re-transmit such signals through network 500, as well as receive signals from network 500 or re-transmit such signals wirelessly to device 530. In another particular embodiment, wireless base station or router 540 may also comprise a cellular tower or a cellular base station which may include a dynamic host configuration protocol (DHCP) client hosted by an internet service provider (ISP) to communicate with Internet 510. In still another particular implementation, wireless base station or router 540 may comprise a wireless router or wireless access point (WAP) that allows wireless communication devices to communicatively couple to a wireless network using Wi-Fi, Bluetooth, or another wireless communications protocol, for example. Such a wireless router or WAP may communicatively couple to a wired network to relay signal information between wireless devices and wired devices on a network, for example. Such wired devices may be communicatively coupled to Internet 510. Of course, the foregoing descriptions of routers, base stations and access points are merely illustrative examples, and claimed subject matter is not so limited. Many other embodiments are possible and are intended to be included within the scope of claimed subject matter.

Figure 10:
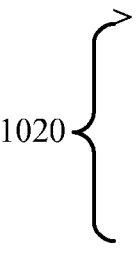
FIG. 10 is a sample listing of a markup language code that may be employed by an embodiment of an integrated digital camera.

As discussed above, a server, such as 560, as an example, may maintain a database of photographic parameter information. It is noted that accumulating such information may take place by any one of a variety of techniques and it is not intended that claimed subject matter be limited to a particular one. Nonetheless, for the purposes of illustration, an example shall be discussed. As discussed previously, for example, through a variety of possible communications networks, wired or wireless, a mobile computing platform or similar device may include the capability to transmit or receive information via a communications network. Likewise, for a device including an integrated digital camera, such a device may be able to transmit photographic parameters to a database available via a communications network or receive photographic parameters from a database available via a communications network. As simply one illustrative example, FIG. 10 is a sample listing of markup language code that may be employed in such a matter. For example, markup language code 1008, comprising a portion of an XML document, for example, may be stored in an embodiment that incorporates an integrated camera, such as previously described, for example. Markup language code 1008 may be employed to provide photographic or other information to a server, such as server, 560, as an example. Likewise, server 560 may employ a similar XML document to transmit photographic parameter information to other users via the Internet, for example.

For example, in a particular implementation, photographic or other camera information may be provided via a wireless network or the Internet to a server that maintains a relatively large database of such information acquired from multiple users. Such information may comprise photographic details from multiple captured images of multiple users in a variety of photographic situations. For example, such information, which may include photographic parameters or other camera information that may be useful for a user about to attempt to capture an image in a similar setting or situation, such as location, time of day, particular camera model or type, white balance setting, aperture setting, shutter speed, to just to name a few examples, which may be maintained in an exchangeable image file format (EXIF). Such a database may be accessible from a website provided on the Internet, for example, and may comprise useful information for users in a variety of situations. Users may access such a database to retrieve information that may be useful for capturing an image in a similar situation to their situation. For example, a user may be preparing to photograph the Lincoln Memorial in Washington D.C. on May 9, during cloudy skies. A database may include photographic information provided by a user who already shot such a photograph in such conditions. Such matching conditions, therefore, may be useful for the user who is just about to attempt to capture an image in similar circumstances. In a particular example shown in FIG. 10, lines 1020 include values for exposure time, SPS or GPS coordinates, a compass measurement, and mode selection. Of course, such details of a markup language code are merely examples, and claimed subject matter is not so limited. Likewise, over time, photographic parameter information that may be included may increase as integrated digital cameras include more advanced technology.

For example, in another particular implementation, photographic details from multiple captured images of multiple users in a variety of photographic situations may be captured by a server. For example, a user may capture an image and setting or other parameters for the particular image may be transmitted to a server maintaining such a database, for example. Again, information nmay include photographic parameters or other camera information that may be useful for a user about to attempt to capture an image in a similar setting or situation, such as location, time of day, particular camera model or type, white balance setting, aperture setting, shutter speed, to just to name a few examples. Likewise, in this particular embodiment, the user's JPEG image may be stored as well as a version in a compressed raw signal format. Such a server may apply a process to evaluate related captured images, such as based, for example, at least in part on raw images, and also based at least in part on which setting(s) appear to be more prevalent notify users that other images are being captured using different parameters or settings. Such matching conditions, therefore, may be useful for the user who is just about to attempt to capture an image in similar circumstances. For example, a user may be given a choice to maintain the settings that produced the captured image or to recapture an image using more prevalent settings. Likewise, such a server may provide accumulated statistics of chosen parameters or settings and offer users an opportunity to view images captured by others, if desired and available.

In still another particular implementation, an embodiment may use sonar or other ranging techniques to determine position in terms of whether a device is indoors or outdoors. For example, an embodiment may emit sound or ultrasound waves and subsequently "listen" for reflections. Such reflections may comprise reflections off of room or building surfaces, such walls or a ceiling, for example. Accordingly, detected reflections of sound or ultrasound waves emitted may indicate an indoor position. Of course, other ranging techniques may involve, in addition to sound or ultrasound, such as laser light, or other forms of energy, for example. Such techniques are explained in further detail below.

Figure 8:
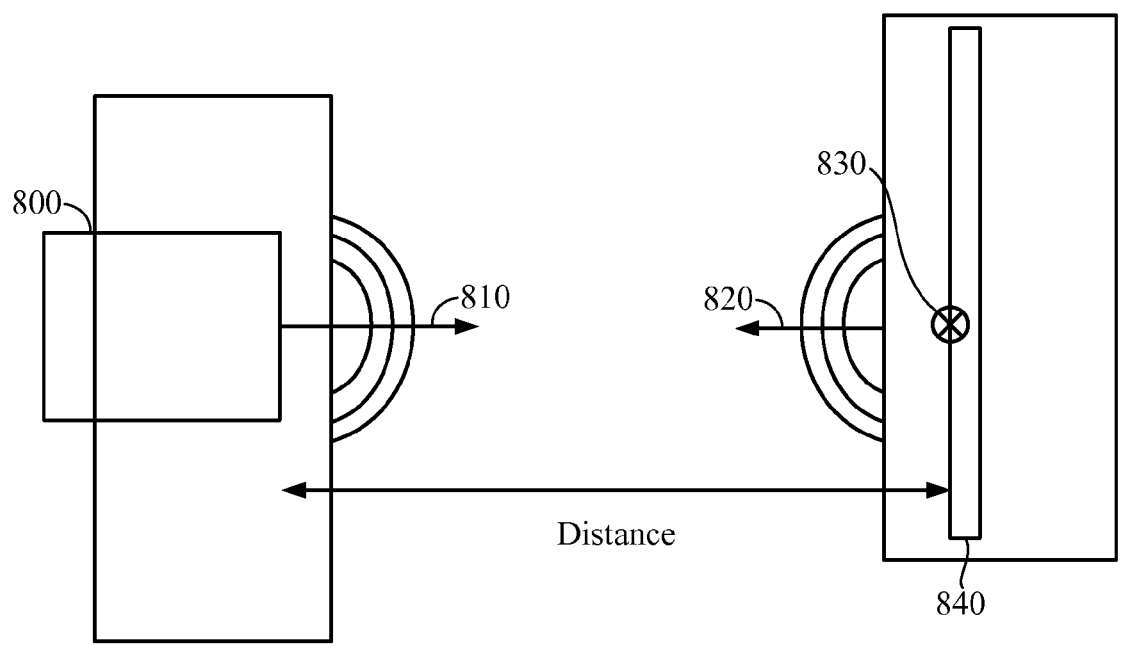
FIG. 8 is a schematic diagram of an embodiment of a sound or EM wave sensor integrated in an embodiment of a mobile device.

FIG. 8 is a schematic diagram showing an embodiment 800 to detect a surface 840, such as a wall or ceiling of an indoor environment. For example, an embodiment may comprise a mobile computing platform or similar device that integrates a digital camera and hardware, software or firmware to generate sound or ultrasound waves and detect reflections, for example, as mentioned above. In one particular implementation, embodiment 800 may transmit or receive sound or ultrasound energy comprising substantially directed sound or ultrasound waves having subsonic or supersonic frequencies. In another particular implementation, embodiment 800 may transmit and receive electromagnetic (EM) energy comprising RF radiation or light having visible or IR wavelengths. In other particular implementations, embodiment 800 may utilize detection techniques such as RT60, adaptive echo canceller parameters, or active noise cancellation process parameters, just to name a few examples. Of course, such descriptions of sound or EM energy are merely examples, and claimed subject matter is not so limited.

Embodiment 800 may emit energy, such as sound or EM waves 810, toward a point 830 on surface 840. Such energy may be generated via one or more transducers powered by voltage generators or current generators or digital signal processors, for example. Energy 810 may comprise a pulse of energy, e.g., a relatively short wave-train of sound or EM energy having a particular duration. Such a pulse may be encoded, for example, to provide a technique for distinguishing multiple pulses from a single device, or from multiple other devices, from one another. Subsequently, energy 820 reflected from surface 840 may travel back to embodiment 800, where a measurement of time elapsed between emission and reception at the receiver may be performed. Such an elapsed time may be referred to as propagation time. Using knowledge of the speed of sound or ultrasound or EM energy emitted and received a presence or proximity to a wall or ceiling of an indoor space may be determined. As discussed above, such a determination may indicate an indoor or outdoor position for a device, for example. Of course, such details are merely examples, and claimed subject matter is not so limited. For example, in another embodiment, propagation time may be unimportant. For example, simply the detecting of reflected energy above the noise floor of the receiver within a particular window of time may indicate presence or absence of a wall or ceiling. Likewise, rather than a directed pulse, in another embodiment, an omni-directional signal may be emitted, for example. A significant range of variations are possible and claimed subject matter is not limited to a particular approach. It is intended that claimed subject matter include all such approaches. Furthermore, once an embodiment is able to determine presence or absence of a ceiling or wall, for example, as previously discussed, this information may be employed to affect a variety of photographic or camera parameters.

Figure 9:
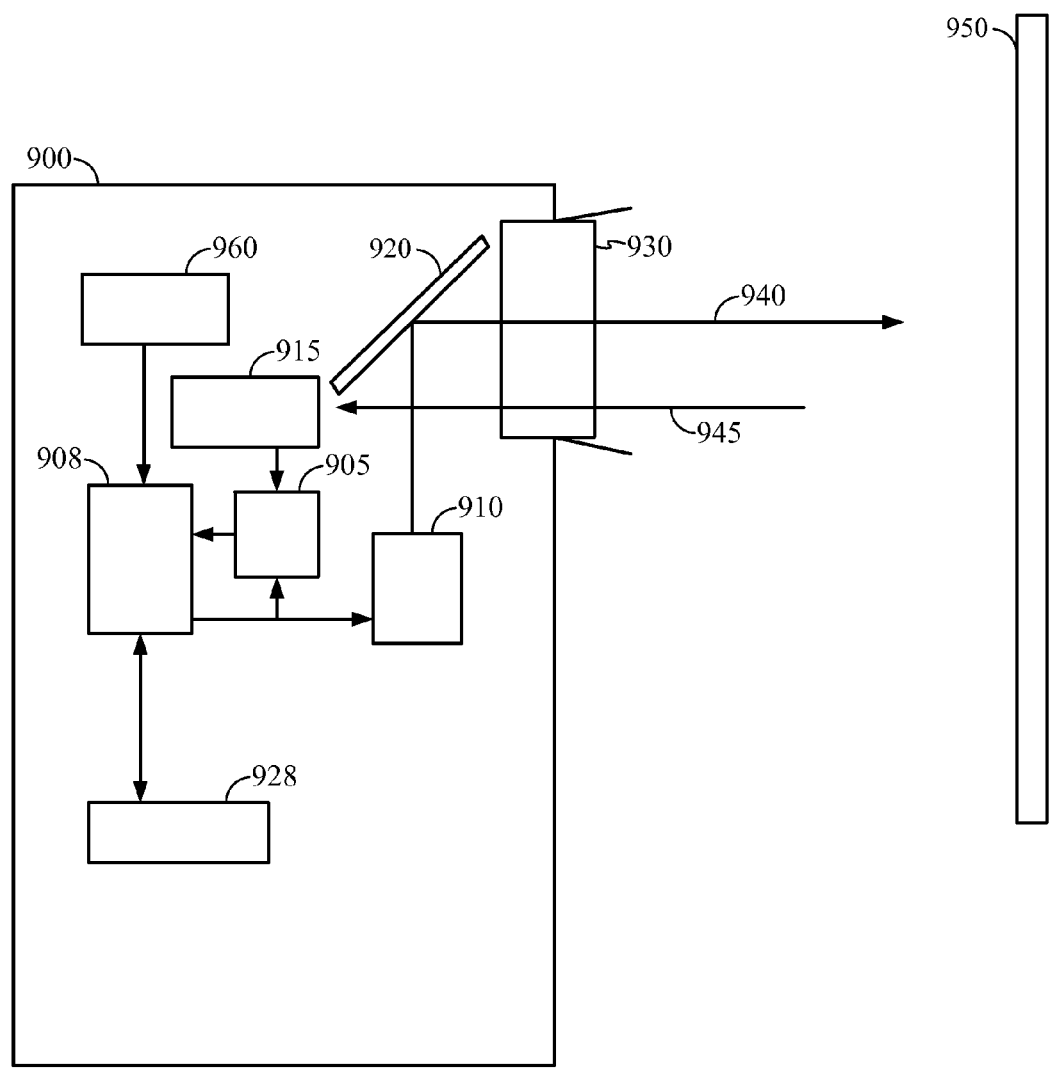
FIG. 9 is a schematic diagram of another embodiment of a sound or EM wave sensor integrated in an embodiment of a mobile device.

FIG. 9 is a schematic diagram showing another embodiment 900 that may include a sensor to detect presence of a surface, such as 950. As alluded to previously, an embodiment may include an integrated digital camera, such as camera 402 shown in FIG. 4, or position sensors for measuring orientation of camera 402, such as accelerometers or another type of transducer, such as a compass or clinometers, described in more detail below, for example. Upon receiving emitted energy from an emitter 910, an optional reflector 920 may direct energy 940 via opening 930 away from the device in a direction so that if a surface, such as surface 950, is encountered, energy is reflected back to the device. Emitter 910 may comprise an omni-directional or directional emitter. In a particular implementation, for example, emitter 910 may comprise an ultrasonic transducer, such as a ceramic piezoelectric device or a polymer piezoelectric film (PVDF). Directional characteristics of such transducers may be varied according to their particular design, related circuitry, or the design of the housing and local physical characteristics of the device, as examples. For example, a q-factor, or 3 db bandwidth versus center frequency may be varied by an RLC network. In a particular example, a 10-20 volt peak-to-peak square wave pulse train may be applied to a ceramic piezoelectric device while a 150 volt peak-to-peak square wave pulse train may be applied to a PVDF transducer. Of course, these are merely illustrative examples of possible implementations. Claimed subject matter is not intended to be limited to any particular implementation.

However, continuing with discussion of an illustrative example, a special purpose processor 908 may receive information from one or more transducers 960 adapted to measure angles in various planes of motion. For example, transducers 960 may comprise one or more compasses or clinometers. Accordingly, such information communicated from transducers 960 to processor 908 may comprise angles of rotation of the device. This information, for example, may be used to select one or more transducers from an array of transducers, or to point a transducer in a particular direction via a motor or actuator. In a particular implementation, reflector 920 may comprise a micro-reflector array to reflect EM energy emitted by emitter 910. Of course, such a description of an MD is merely an example, and claimed subject matter is not so limited. A receiver 915 may receive energy 945 reflected from surface 950 after a propagation time delay from the time energy 940 was emitted from emitter 910. Receiver 915 may comprise a microphone that may also be used to receive speech during one or more applications executed by the device, for example, although, of course, claimed subject matter is not limited in scope in this respect. Such a delay may be measured by a time module 905, which may monitor signals transmitted from processor 908 to emitter 910 that initiated energy emissions 940, for example. Accordingly, time module 905 may measure a time difference between the time energy 940 is emitted and the time energy 945 is received. Time module 905 may involve digital time domain correlation, but analog time domain correlation may be utilized in other implementations. Of course, in another embodiment, as previously indicated propagation time may be unimportant. For example, simply detection of reflected energy above the noise floor of the receiver within a particular window of time may indicate presence or absence of a wall or ceiling. Likewise, in a particular implementation, a lack of received energy 945 may indicate that a surface 950 is not present, which may be the case for an outdoor location of the device, for example. A particular embodiment may also incorporate multiple sensors oriented in various, such as orthogonal, directions in order to detect presence of possible walls or a ceiling in several directions. For example, a device may be located next to a wall in a yard outdoors, or outside, next to a building. A single sensor may detect such a surface, but additional sensors may be utilized, e.g., a lack of a second or third surface may confirm that the device is outdoors, for example. Of course, such methods of measuring propagation time of energy are merely examples, and claimed subject matter is not so limited.

In other particular implementations, embodiment 800 may utilize detection techniques such as RT60, echo cancellation, or active noise cancellation, just to name a few examples. RT60 is a measurement of how long it takes sounds to decay to 60 dB of its original output amplitude. In a particular embodiment, for example, an omni-directional emitter may emit a pulse which may comprise ultra or sub-sonic sound, for example. An RT60 measurement should indicate if pulses are emitted from an indoor or an outdoor location. As suggested previously, for example, in an embodiment, a microphone used for speech may also be used for an RT60 measurement, although claimed subject matter is not limited in scope in this respect. Alternately or additionally, echo or active noise cancellation process parameters may be employed in a particular embodiment. For example, for a mobile computing platform that includes integrated phone capability, the mobile platform or device may include processes to perform echo cancellation or active noise cancellation to improve sound integrity for the integrate phone capability. Typically, such processes employ feedback mechanisms to remove unwanted or undesirable signals by superposition of an estimation of the unwanted or undesirable signals with the desired signals. In situations in which the device is being employed at an indoor position, a feedback estimate of unwanted or undesirable signals should be different than a feedback estimate for situations in which the device is being employed at an outdoor position. Therefore, this difference in estimates may provide another technique for assessing the location of the device at an indoor versus an outdoor position.

Figure 13:
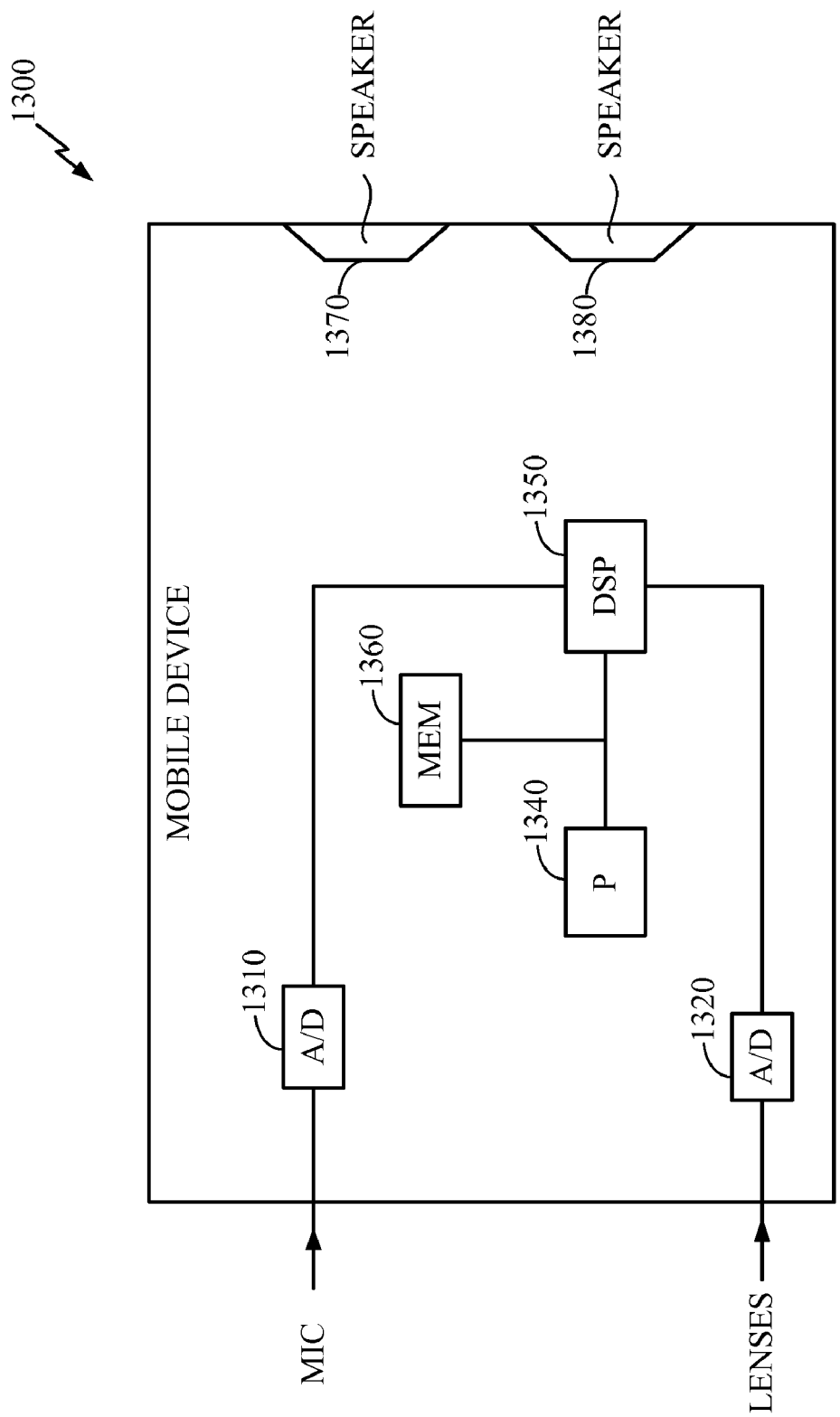
FIG. 13 is a schematic diagram of another embodiment of a mobile device or computing platform, such as one that may include an integrated digital camera.

FIG. 13 is a schematic diagram showing another embodiment 1300 that may include a sensor to detect presence of a surface. As shown in FIG. 3, a mobile device embodiment, such as 1300, may include a microphone capable of receiving audio signals and lenses capable of receiving light. These analog signals may be converted by analog to digital converters 1310 and 1320 to digital signals for further processing by general purpose processor or CPU 1340 and digital signal processor 1350. For this particular embodiment, these processors employ a shared memory 1360, although claimed subject matter is not limited in scope in this respect. Furthermore, claimed subject matter is not in general limited to this example of a particular embodiment. This example is provided merely for purposes of illustration. Mobile device 1300 also includes speakers 1370 and 1380 which may be employed to emit audio signals, such as of the type previously described, for example.

Figure 14:
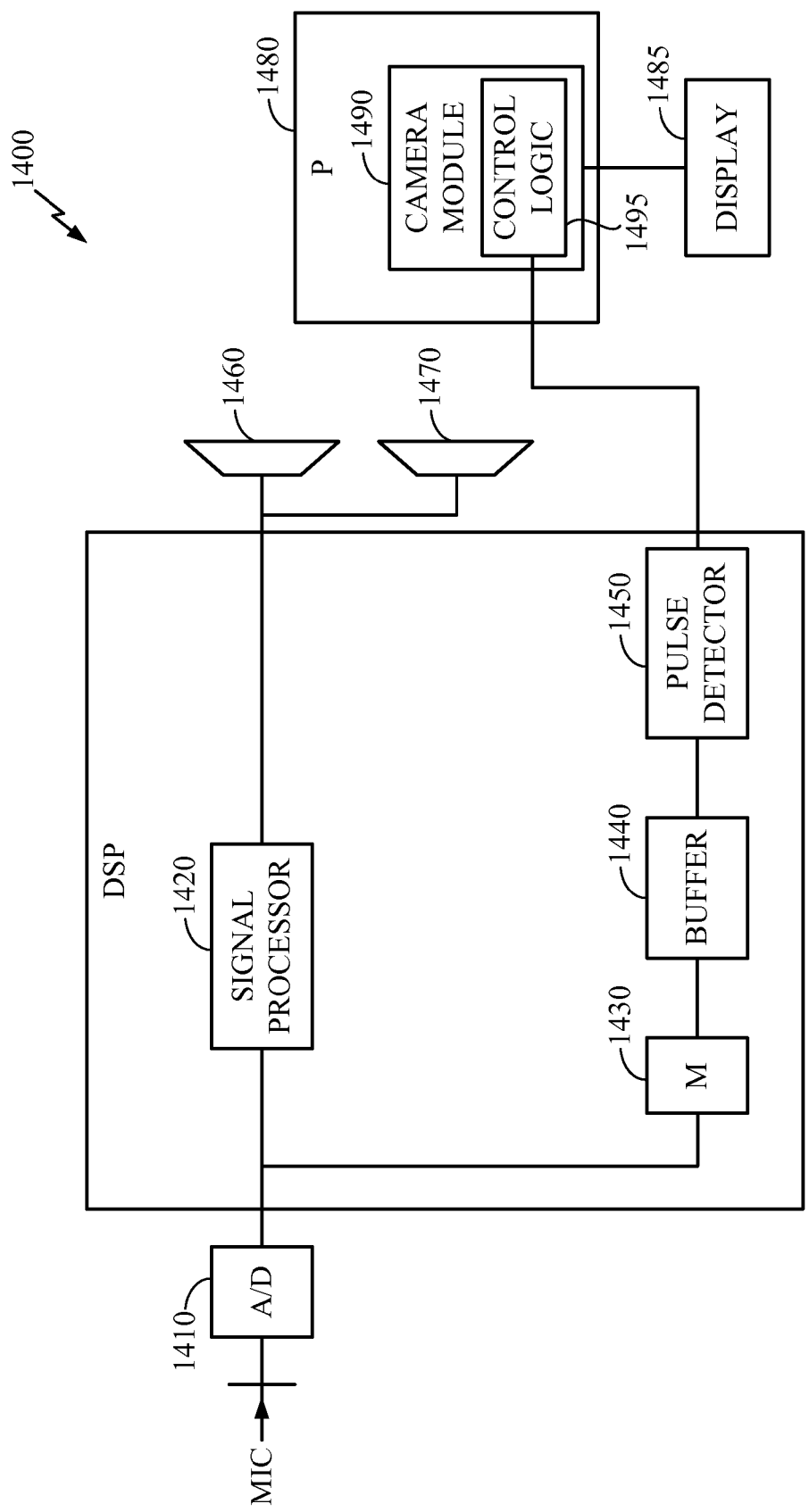
FIG. 14 is another representation of the embodiment shown in FIG. 13.
Figure 15:
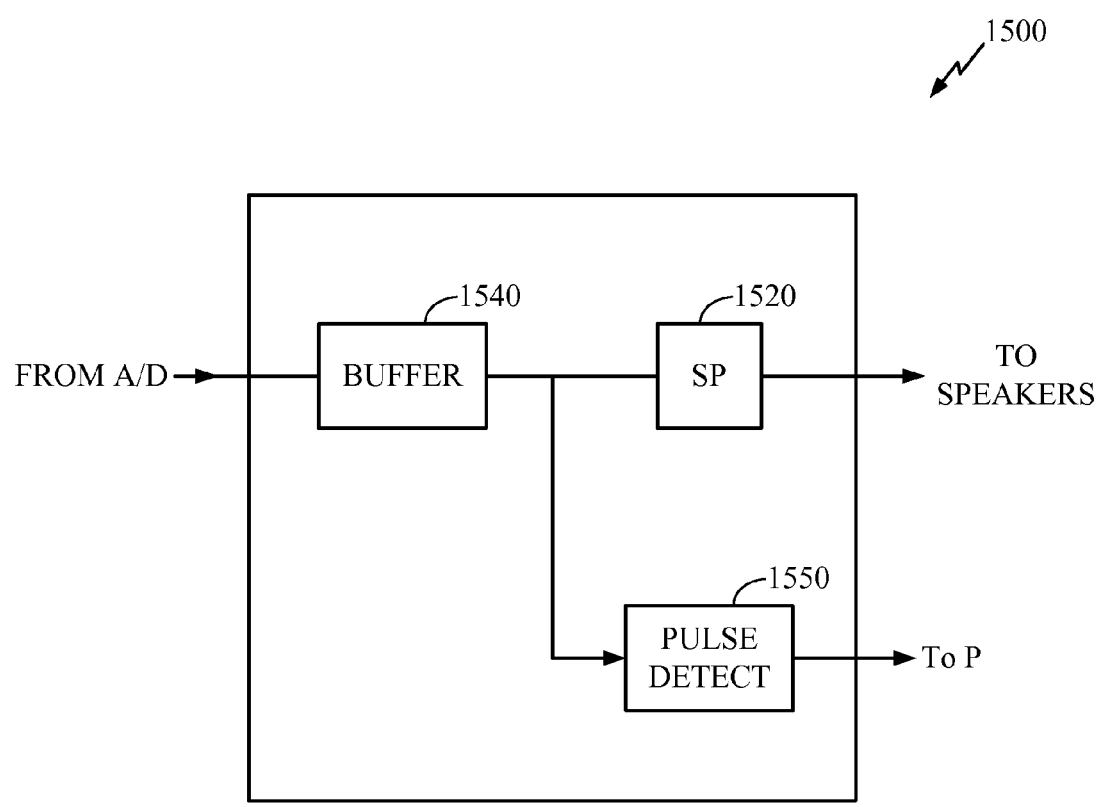
FIG. 15 is another representation of the embodiment shown in FIG. 13.
Figure 16:
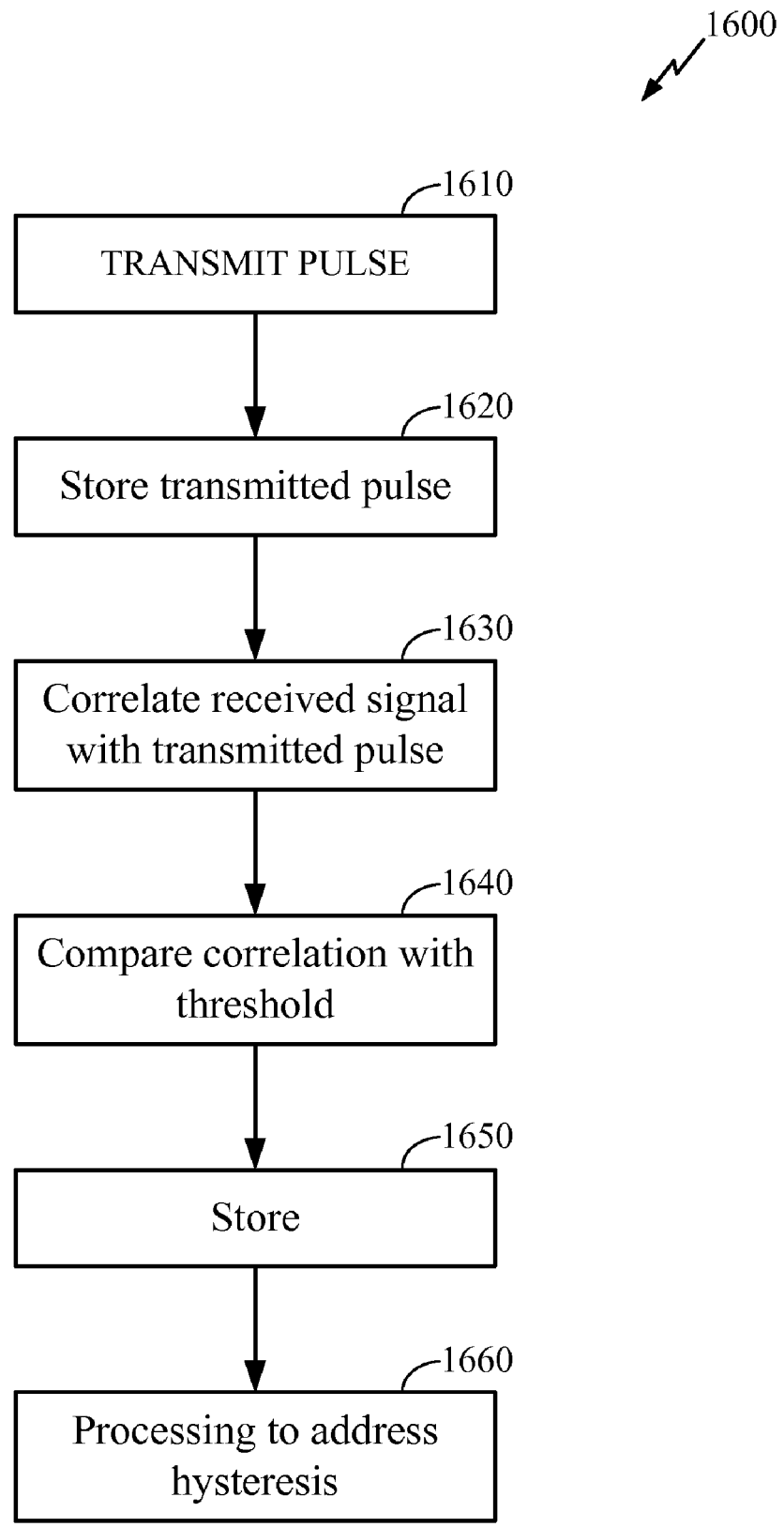
FIG. 16 is a flow diagram illustrating an aspect of the embodiment of FIG. 13.

FIGS. 14 and 15 are alternate representations of the embodiment shown in FIG. 13. These representations illustrate alternate signal process flows that may be employed in various approaches within the scope of claimed subject matter. For example, audio signals received by a microphone may be converted to digital signals for processing, as mentioned above, the embodiment shown in FIG. 14 illustrates alternate signal paths for such processing. For example, along one signal path, audio signals may be processed such as speech processing that may occur, for example, if, depending at least in part on the particular embodiment, a phone call is being made using a mobile device. In such an embodiment, audio signals may be output through speakers of the device for half or full duplex mode, for example. However, alternately, in a situation in which an audio pulse has been generated, for example, such a pulse may be output via speakers 1460 and 1470. This approach is illustrated, for example, by viewing a flow diagram embodiment illustrated by FIG. 16 in conjunction with these figures. Referring to FIG. 16, for example, a pulse generated may be transmitted as illustrated by block 1610 and may also be stored in memory as illustrated by 1430 in FIGS. 14 and 1620 in FIG. 16. Likewise, a received signal or return signal may be also be converted and stored in buffer 1440 in FIG. 14. As shown by block 1630, the received signal and transmitted pulse may then be correlated and the resulting value at block 1640 may be compared with a threshold value that is modifiable, if desired. The results may be stored, as shown by block 1650 and additional processing may be employed at block 1660 to address the possibility of hysteresis may be employed. For example, the results from multiple pulses may be compared or averaged.

Processing as described may be employed to make a determination regarding whether an image is being captured indoors or outdoors. This is illustrated in FIG. 14 by camera module 1490 which includes control logic 1495 to receive output signals from pulse detector 1450. Likewise, FIG. 15 illustrates yet another alternate embodiment. As FIG. 15 demonstrates, audio signals may be buffered before being sent along split signal paths as described above.

Figure 17:
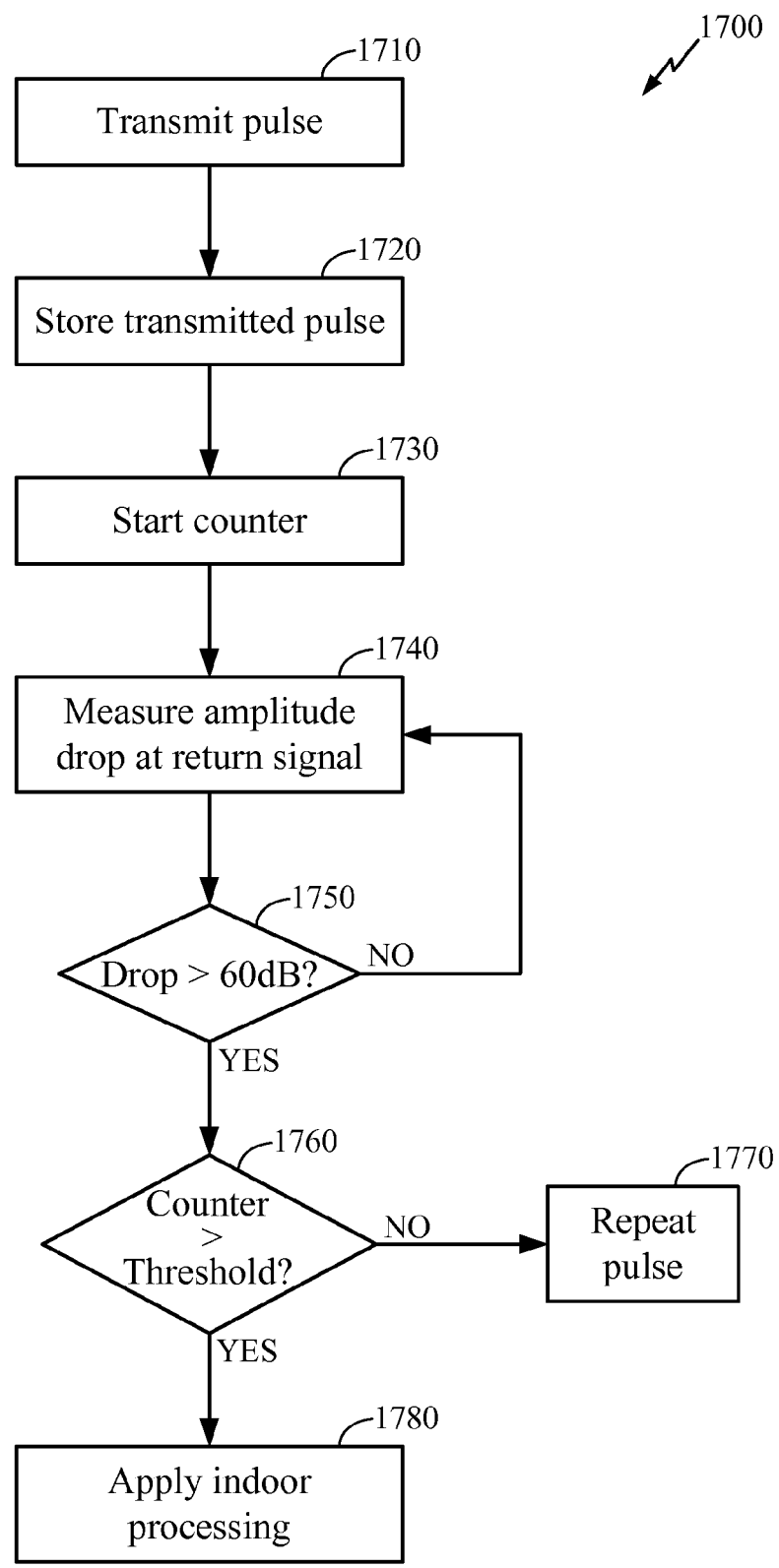
FIG. 17 is another flow diagram illustrating an aspect of the embodiment of FIG. 13.

FIG. 17 is a flow diagram embodiment illustrating application of an RT60 measurement, such as previously described. As illustrated, a pulse may be transmitted and stored, as shown by blocks 1710 and 1720. Likewise, a counter may be initiated and a mobile device may continue to measure return signals from the transmitted or generated pulse. A decision loop continues to monitor the signal until amplitude is detected indicating a drop of 60 dB. The time it took for amplitude to decline may be compared with a threshold value to make a determination regarding whether the mobile device in located indoors or outdoors. This information may be employed to affect white balance as previous described. Likewise, as illustrated by block 1770, pulses may be repeated to verify the integrity of results.

Figure 7A:
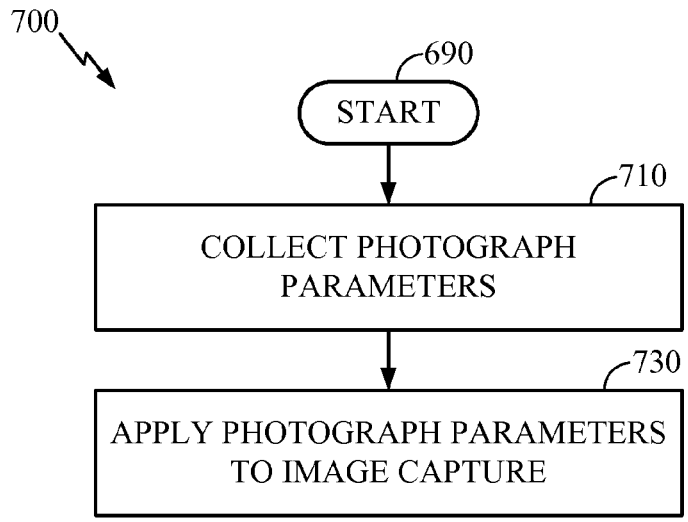
FIGS. 7A, 7B and 7C are a flow diagram of an embodiment of a process for using signal measurements to affect photographic parameters.

FIG. 7A is a flow diagram of an embodiment 700 of process for determining photographic parameters. Of course, claimed subject matter is not limited in scope to a particular embodiment. Embodiment 700 is provided only for purposes of illustrating. Embodiment 700 begins at start block 690. For a typical device that may include an integrated digital camera, for example, the camera portion of the device may be activated.

Figure 7B:
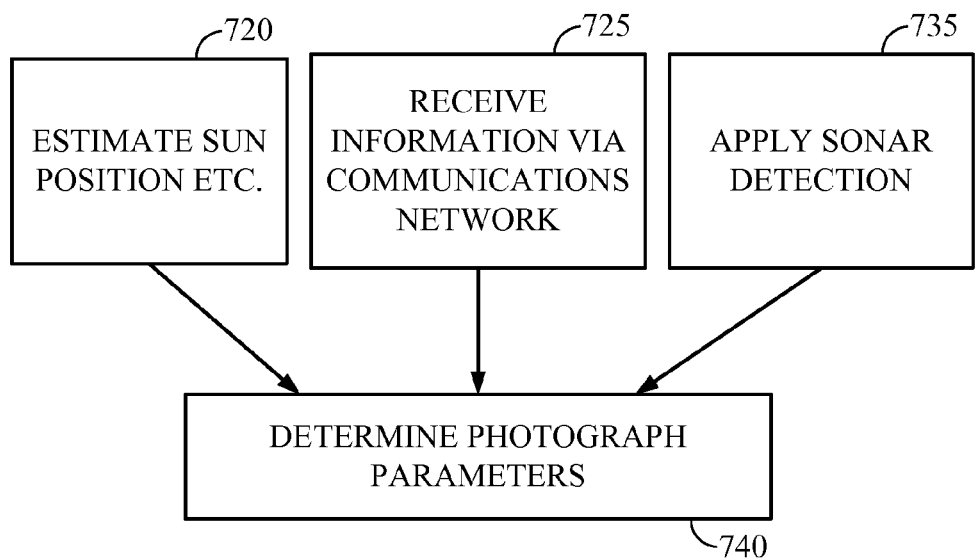

At block 710, a device may collect photographic parameters. FIG. 7B illustrates block 710 in more detail. As discussed above, a variety of approaches are available to affect selection or setting of photographic parameters and a variety of embodiments are possible For example, one approach may be employed or a combination of approaches may be employed. As previously discussed and illustrated at block 720, Sun position may be estimated. For example, in a particular embodiment, a device may wirelessly acquire information from one or more of several sources. Such information may include satellite positioning information received from an SPS, allowing determination of geodetic position. Furthermore, SPS information may also include time of day, although a mobile computing platform may comprise an onboard clock or calendar as well. Other techniques for determining position-location and/or time of day may include accessing information via a Personal Area Network (PAN), a Local Area Network (LAN), a Wide Area Network (WAN), Ultra-wideband (UWB), AFLT, digital TV, a wireless repeater, RFID, a radio-location beacon, cell tower ID, or Bluetooth, just to name a few examples. Some positioning techniques may provide less precise position information compared to other positioning techniques. Less precise position information, which may be sufficient for implementations described herein, may pinpoint location within a relatively large area, such as a building, city block, or state, for example. Likewise, a mobile computing platform may determine its position from time to time, continually, periodically, or in preparation of capturing an image, for example. Of course, such details of determining position are merely examples, and claimed subject matter is not so limited.

Likewise, in a particular implementation, a device may wirelessly receive photographic information from the Internet via a base station or router, for example, shown in block 725 of FIG. 7B. Such photographic information, which may comprise details regarding photographic conditions at particular locations around the Earth, may be maintained on a server communicatively coupled to the Internet. For example, a user may manually provide a location by entering a location via a touch-screen, keypad, or the like. After entering or determining location, a request may be transmitted to a server via the Internet resulting in the receipt of information regarding photographic parameters at the location, as previously described. In another particular implementation, weather information may be received wirelessly as well. Such weather information may be useful for determining affects of daylight illumination, for example.

Figure 12:
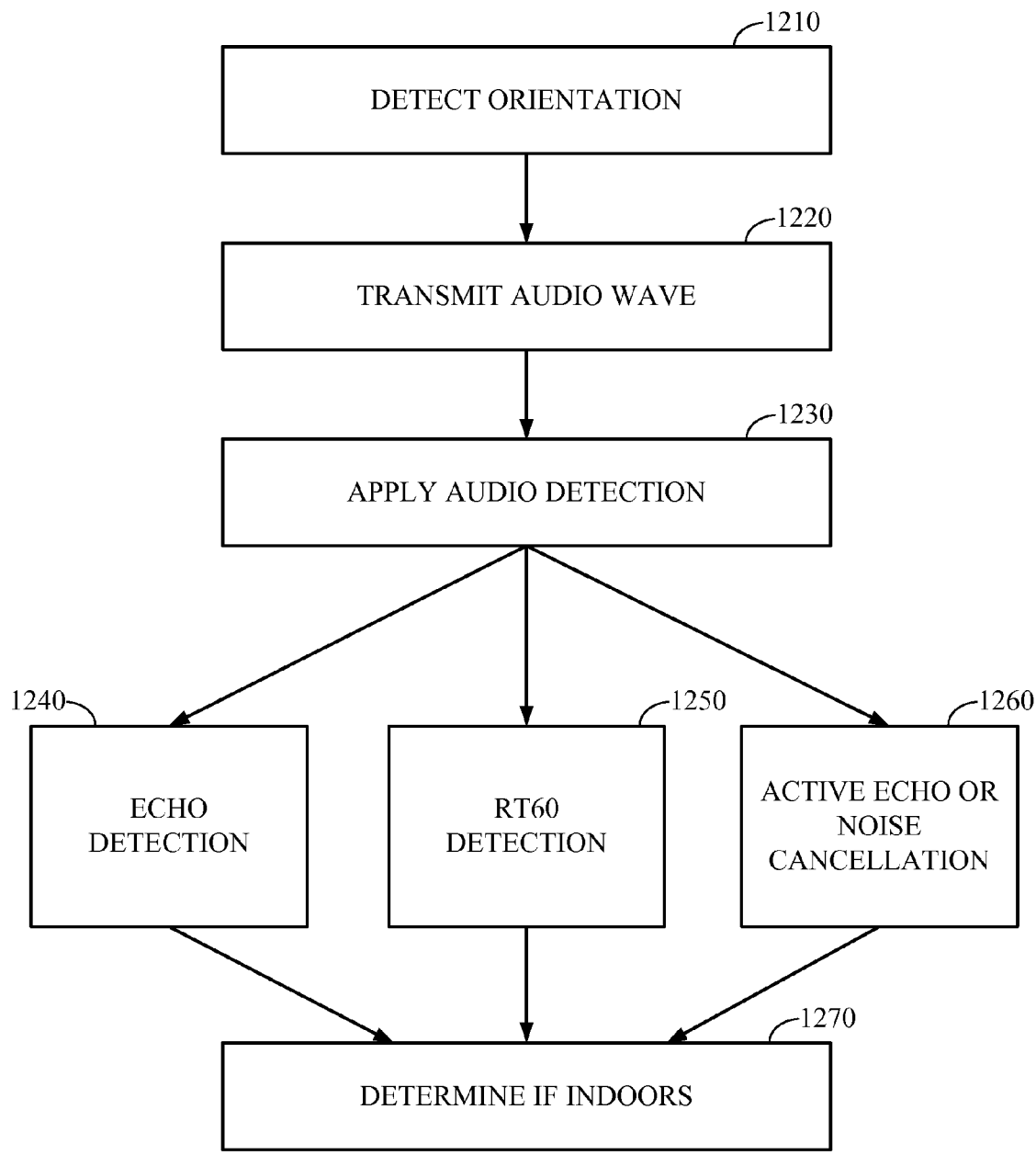
FIG. 12 is a flow diagram illustrating an aspect of the embodiment of FIGS. 7A-7C in more detail.

Alternatively or in addition, a sonar detection process may be performed, indicated by block 735, and results, as discussed below, used to affect photographic parameters. FIG. 12 shows the details of block 735 in more detail. As shown, in an embodiment, at block 1210, orientation may be detected to assess directionality with respect to sound that may be emitted and reflections that may be detected. For example, a ceiling is a likely indicator of indoor position, whereas detection of a single wall may not be. At 1220, an audio wave may be transmitted. Previously, in connection with FIG. 9, emission of an audio wave was discussed in detail. Likewise, in other embodiments, an EM wave rather than an audio wave, for example, may be emitted. Block 1230 indicates the application of audio detection. For example, a reflected echo may be detected (block 1240), RT60 detection may occur (block 1250) or active echo or noise cancellation may be applied (block 1260). It is noted that any combination of these approaches may be employed or they may be employed individually, depending, for example, on the particular embodiment. Likewise, as described below, an indoor position detection may be employed to affect photographic parameters.

At block 740, depending on which approach was employed, the information obtained may be employed to affect the determination of photographic parameters for an image to be captured. For example, SPS information, time of day, or calendar information may be used to determine a position of the Sun. As discussed previously, photographic parameters may be determined based, at least in part, on an estimate of Sun position relative to the device. Alternatively, information about photographic parameters obtained, for example, via a server may be applied to determine photographic parameters as discussed in more detail below. Likewise, weather information may also be employed if obtained. Alternatively or in addition, as indicated previously a sonar detection process may be performed and results, as discussed below, used to affect photographic parameters.

Figure 7C:
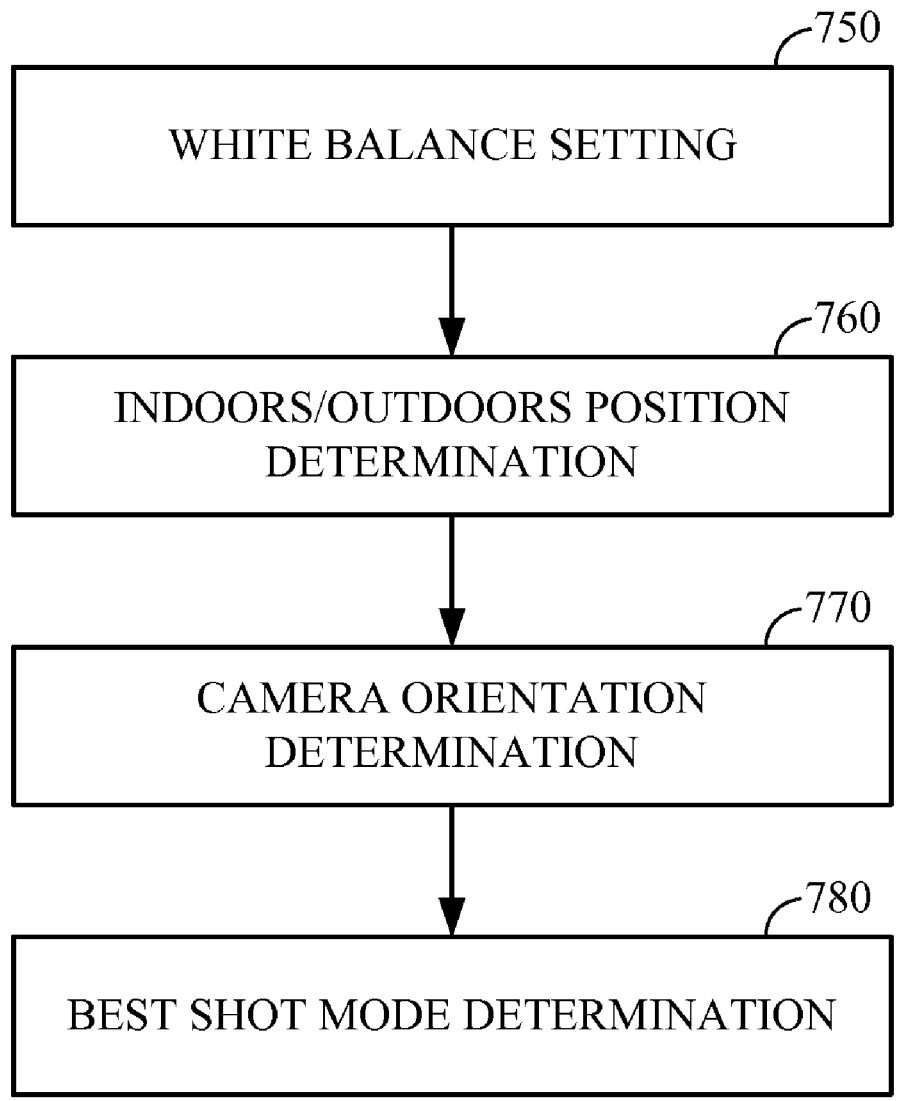

Returning to FIG. 7A, at block 730, photographic parameters may be applied for white balance, flicker detection and compensation, best shot mode and camera orientation. These are discussed in detail below in connection with FIG. C, which illustrates block 730 in more detail; however, again, it is noted that this example is for illustration purposes only. Therefore, other embodiments may employ some, all or additional photographic parameters to various other camera settings. Likewise, the order discussed and shown in FIG. 7C is not intended to convey special significance. For example, various operations may be performed concurrently.

From the information obtained, as shown by block 750 of FIG. 7C, a white balance setting may be determined. For example, if a photo is to be captured during an either rising or setting sun, the device may take such information into account as described previously in connection with FIGS. 1 and 3. These may be determined, for example, based at least in part on estimating Sun position or from photographic parameters obtained via a server, for example. In a particular implementation, in addition, weather information may be wirelessly received from the Internet. Just as time of day may determine aspects of photographic lighting, weather may also affect lighting conditions. For example, foggy, cloudy, or hazy skies may scatter sunlight so that a reddish hue that may otherwise be expected during sunrise or sunset times is not present. Of course, details of such processes are merely examples, and claimed subject matter is not so limited.

At block 760, in a particular implementation, information received may be employed to determine an indoor or an outdoor position. For example, SPS information or other position information may indicate a location within an indoor shopping mall, a house, or other building. Accordingly, such a location determination may be employed to affect photographic parameters. For example, a device located outdoors may omit flicker detection and compensation, as previously described. However, a device located indoors may apply flicker detection and compensation. Likewise, an indoor versus and outdoor location may affect white balance. For example, illuminants for artificial light rather than natural light may be employed for a white balance determination as previously described.

At block 770, in a particular implementation, an integrated digital camera may determine its orientation with respect to the position of the sun, as previously described, for example. For example, photographic parameters may vary depending whether or not a photo is to be captured in a direction of the Sun (e.g., photographic subject is backlit).

Device orientation relative to the Sun may be determined from time to time, continually, periodically, or in preparation of capturing an image, for example. In one particular implementation, one or more sensors may be employed determine one or more angles of orientation. For example, such sensors may comprise an accelerometer, magnetometer, compass, pressure sensor, or a gyro, just to name a few examples. Accordingly, such sensors may measure direction, elevation, inclination, or the like during preparation of an image capturing process. For example, the Sun may be estimated to be located twenty degrees to the right of a central portion of a photographic subject, at an incline of thirty-five degrees. Accordingly photographic parameters such as exposure or white balance may be modified for a resulting captured image. Of course, details of such sensors are merely examples, and claimed subject matter is not so limited.

Block 780 of FIG. 7C indicates an affect of photographic parameters on best shot mode. For example, using indoor versus outdoor position determination, a device located indoors need not consider a best shot mode for shooting in snow or at a fireworks display; such modes may be eliminated from consideration while establishing photographic parameters. However, an outdoor position location indicates consideration of such modes. Of course, such affects of being indoors or outdoors are merely examples, and claimed subject matter is not so limited.

Figure 11:
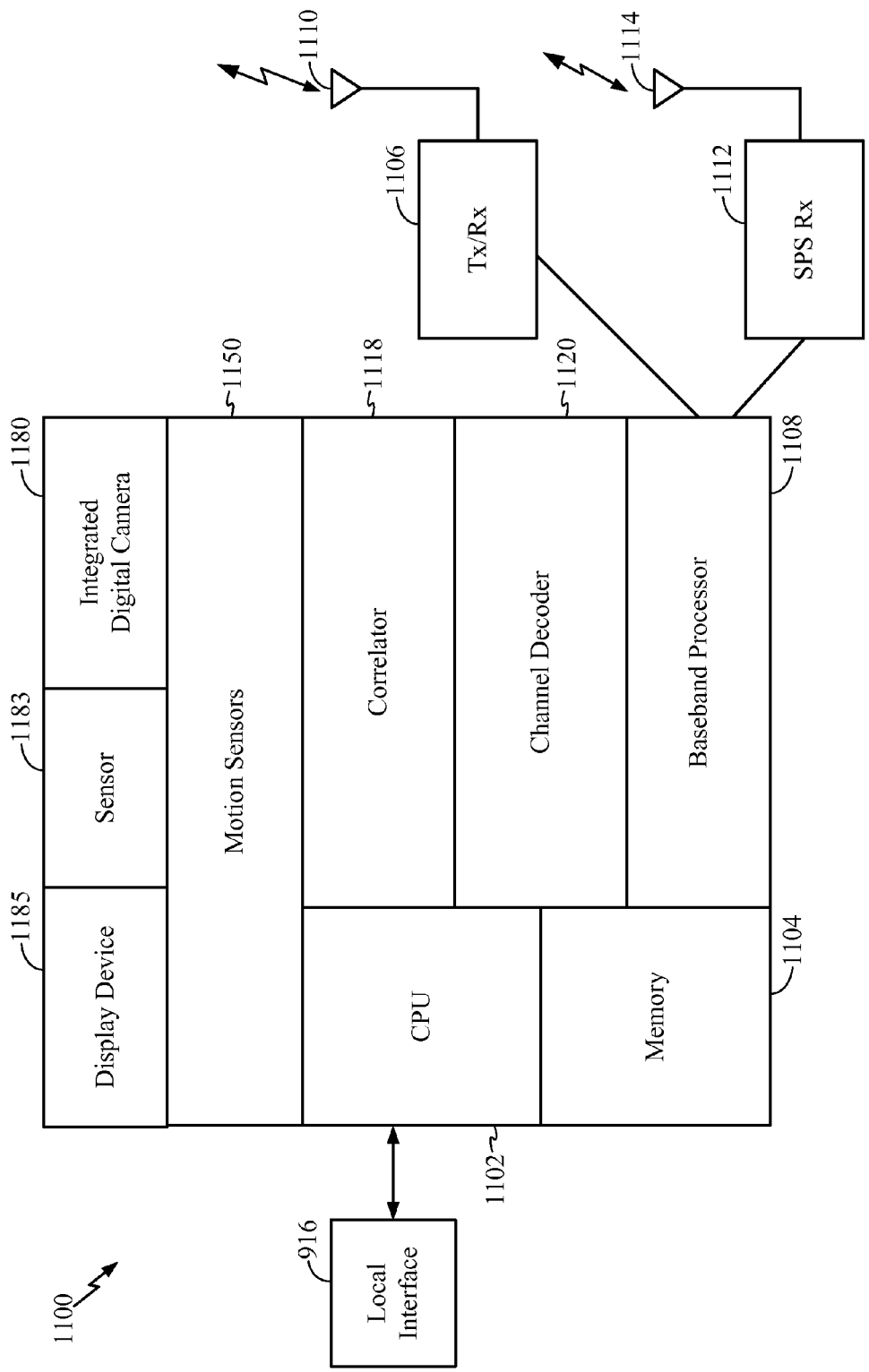
FIG. 11 is a schematic diagram of an embodiment of a mobile device or computing platform, such as one that may include an integrated digital camera.

FIG. 11 is a schematic diagram of an embodiment 1100 in accordance with claimed subject matter. A particular embodiment may be capable of sensing motion and communication with a wireless network, as described below. Such a device may include an integrated digital camera 1180. It is noted, of course, that a digital camera may comprise a still camera or a video camera. A particular embodiment 1100 may be capable of processing SPS signals received at an antenna 1114 for determining position or communicating with a wireless communication network through antenna 1110. Here, a radio transceiver 1106 may be capable of modulating an RF carrier signal with baseband information, such as data, voice, or SMS messages, onto an RF carrier, and demodulating a modulated RF carrier to obtain such baseband information. Antenna 1110 may assist in transmitting a modulated RF carrier over a wireless communications link and in receiving a modulated RF carrier over a wireless communications link.

Baseband processor 1108 may provide baseband information to transceiver 1106 for transmission over a wireless communications link. CPU 1102 may provide baseband information to baseband processor 1108 that it may obtain from a local interface 1116 which may include, for example, environmental sensory data, motion sensor data, compass data, acceleration information (e.g., from an accelerometer), proximity to other networks (e.g., ZigBee, Bluetooth, WiFi, peer-to-peer). Such baseband information may also include position information such as, for example, an estimate of location or information that may be used in computing location such as, for example, pseudorange measurements. Channel decoder 1120 may be capable of decoding channel symbols received from baseband processor 1108 into underlying source bits.

SPS receiver (SPS Rx) 1112 may be adapted to receive and process transmissions from SVs, and provide processed information to correlator 1118. Correlator 1118 may be adapted to derive correlation functions from the information provided by receiver 1112. Correlator 1118 may also be adapted to derived pilot-related correlation functions from information relating to pilot signals provided by transceiver 1106. This information may be used by device 1100 to acquire a wireless communications network.

Memory 1104 may be employed to store machine-readable instructions which may be executable to perform one or more of processes, examples, implementations, or examples thereof which have been described or suggested. CPU 1102, which may comprise a special purpose processor in some embodiments, may execute such machine-readable instructions. However, these are merely examples of tasks that may be performed by a CPU in a particular aspect and claimed subject matter in not limited in these respects. Memory 1104 may also be employed to store photographic information, such as information related to while balance or other photographic parameters determined by CPU 110 and to be applied to a particular image that is to be captured, for example.

Motion sensors 1150 may include one or more transducers to measure motion of embodiment 1100. Such transducers may include an accelerometer, a compass, a pressure sensor, or a gyro, for example. Detected motion of device 1100 may include rotation or translation. Measurements of one or more such motions may be stored in memory 1104 so that stored measurements may be retrieved for use in determining an orientation of device 1100 relative to the sun, as in explained previously, for example.

In an implementation, integrated digital camera 1180 may comprise a digital camera including a charge coupled device (CCD) array or a CMOS array of light sensors, focusing optics, a viewfinder, or interfacing electronics to communicate with CPU 1102 and memory 1104, for example. Display device 1185 may comprise a liquid crystal display (LCD) that, in some implementations, may be touch sensitive to provide a mechanism for user interaction. Display device 1185 may also operate as a viewfinder although claimed subject matter is not so limited. Images may be stored in memory 1104 so that stored images may be retrieved as a selected target object, for example. Embodiment 1100 may include a sensor 1183 such as described in connection with embodiment 800 shown in FIG. 8, for example. Of course, such details of a device 1100 are merely examples, and claimed subject matter is not so limited.

Methodologies described herein may be implemented by various approaches depending at least in part upon particular applications being implemented. For example, such methodologies may be implemented in hardware, firmware, software, or combinations thereof. However, it is not intended that an embodiment comprise only software per se. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform functions described herein, or combinations thereof. For a firmware or software implementation, methodologies may be implemented with modules (e.g., procedures, functions, or the like) that perform functions described herein. Any machine-readable medium tangibly embodying instructions may be used in implementing methodologies described herein. For example, software or code may be stored in a memory and executed by a processor. Memory may be implemented within a processor or external to a processor. As used herein the term "memory" refers to any type of long term, short term, volatile, non-volatile, or other memory and is not to be limited to any particular type of memory, number of memories, or type of media upon which information may be stored.

It will, of course, also be understood that, although particular embodiments have just been described, claimed subject matter is not limited in scope to a particular embodiment or implementation. For example, one embodiment may be implemented on a device or combination of devices, for example. Likewise, although claimed subject matter is not limited in scope in this respect, one embodiment may comprise one or more articles, such as a storage medium or storage media, as described above, for example, that may have stored thereon instructions executable by a specific or special purpose system or apparatus, for example, to implement an embodiment of a method in accordance with claimed subject matter, such as one of the embodiments previously described, for example. As one potential example, a specific or special purpose computing platform may include one or more processing units or processors, one or more input/output devices, such as a display, a keyboard or a mouse, or one or more memories, such as static random access memory, dynamic random access memory, flash memory, or a hard drive, although, again, claimed subject matter is not limited in scope to this example.

In the preceding, various aspects of claimed subject matter have been described. For purposes of explanation, specific details may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill were omitted or simplified so as not to obscure claimed subject matter. While certain features have been illustrated or described herein, many modifications, substitutions, changes, or equivalents may now occur to those skilled in the art. It is, therefore, to be understood that the appended claims are intended to cover all such modifications or changes as fall within the true spirit of claimed subject matter.

What is claimed is:

1. An apparatus comprising:
    a wireless communication device including an integrated digital camera;
    the device configured to estimate position of the Sun relative to the position of the device based at least in part on signal information received via wireless communication;
    the device being further configured to use the estimated position of the Sun so as to affect one or more photographic parameters, wherein the one or more photographic parameters comprise at least one of a best shot mode setting, a flicker detection setting, and a flicker compensation setting.

2. The apparatus of claim 1, wherein the one or more photographic parameters further comprise a white balance setting.

3. The apparatus of claim 2, wherein the device being configured to use the estimated position of the Sun so as to affect the white balance setting includes the device being configured to select potential illuminants for the white balance setting based at least in part on the estimate of the Sun's position.

4. The apparatus of claim 1, wherein the device is further configured to receive the signal information from the Internet.

5. The apparatus of claim 4, wherein the signal information from the Internet also comprises one or more images captured by one or more others, the one or more images captured by one or more others having employed other photographic parameters.

6. The apparatus of claim 2, further comprising a motion sensor to determine the orientation of the device with respect to the estimated position of the Sun.

7. The apparatus of claim 1, further comprising a sensor utilizing electromagnetic signals, audio signals, sonar signals, or any combination thereof.

8. The apparatus of claim 7, wherein at least one of one or more photographic parameters is based, at least in part, on measurements resulting from the sensor.

9. The apparatus of claim 1, wherein the digital camera comprises at least one of: a digital still camera or a digital video camera.

10. A method comprising:
acquiring information via wireless communication;
estimating a position of the Sun relative to a particular selected position based at least in part on the acquired information; and
setting photographic parameters of a digital camera based, at least in part, on the estimated position of the Sun, wherein the photographic parameters comprise at least one of a best shot mode setting, a flicker detection setting, and a flicker compensation setting.

11. The method of claim 10, wherein the photographic parameters further comprise a white balance setting.

12. The method of claim 11, wherein the white balance setting comprises employing selected potential illuminants based at least in part on the estimated position of the Sun.

13. The method of claim 10, wherein the acquiring information comprises receiving satellite positioning system information or time of day information.

14. The method of claim 10, wherein the acquiring information comprises receiving information from the Internet.

15. The method of claim 14, wherein the acquiring information from the Internet also comprises acquiring one or more images captured by one or more others, the one or more images captured by one or more others having employed other photographic parameters.

16. The method of claim 10, further comprising:
determining an orientation of the digital camera relative to the estimated position of the sun using a motion sensor.

17. The method of claim 10, further comprising:
determining whether the digital camera is indoors by detecting signal reflections off of one or more walls.

18. The method of claim 17, wherein the one or more walls includes a ceiling.

19. A device comprising:
a transceiver;
an integrated digital camera;
one or more motion sensors and a special purpose computing device adapted to:
initiate acquisition of information via the transceiver;
estimate a position of the Sun relative to a position of the device based at least in part on the acquired information; and
set one or more photographic parameters of the integrated digital camera based, at least in part, on the estimated position of the Sun, wherein the one or more photographic parameters comprise at least one of a best shot mode setting, a flicker detection setting, and a flicker compensation setting.

20. The device of claim 19, wherein the one or more photographic parameters further comprise a white balance setting.

21. The device of claim 19, wherein the acquired information comprises satellite positioning system information or time of day information.

22. The device of claim 19, wherein the special purpose computing device is further adapted to receive the acquired information from the Internet.

23. The device of claim 22, wherein the acquired information from the Internet also comprises one or more images captured by one or more others, the one or more images captured by one or more others having employed other photographic parameters.

24. The device of claim 19, further comprising:
a sensor to detect signal reflections off of one or more proximate walls.

25. The device of claim 24, wherein the one or more proximate walls includes a ceiling.

26. An article comprising: a non-transitory storage medium comprising machine-readable instructions stored thereon executable to:
initiate acquiring information via wireless communication;
estimate a position of the sun relative to a particular selected position based at least in part on the acquired information; and
set photographic parameters of a digital camera based, at least in part, on the estimated position of the Sun, wherein the photographic parameters comprise at least one of a best shot mode setting, a flicker detection setting, and a flicker compensation setting.

27. The article of claim 26, wherein the one or more photographic parameters further comprise a white balance setting.

28. The article of claim 27, wherein the white balance setting comprises instructions executable to employ selected potential illuminants based at least in part on the estimated position of the Sun.

29. The article of claim 26, wherein the to initiate acquiring information comprises instructions executable to receive satellite positioning system information or time of day information.

30. The article of claim 26, wherein the instructions executable to initiate acquiring information comprise instructions executable to receive the information from the Internet.

31. The article of claim 30, wherein the instructions executable to to receive the information from the Internet comprise instructions executable to receive one or more images captured by one or more others, the one or more images captured by one or more others having employed other photographic parameters.

32. The article of claim 26, further comprising:
instructions executable to determine an orientation of the digital camera relative to the estimated position of the sun using a motion sensor.

33. The article of claim 26, further comprising:
instructions executable to determine whether the digital camera is indoors by detecting signal reflections off of one or more walls.

34. The article of claim 33, wherein the instructions include instructions executable to determine if the one or more walls includes a ceiling.

* * * * *